United States Patent [19]
Obana et al.

[11] Patent Number: 5,136,587
[45] Date of Patent: Aug. 4, 1992

[54] DIGITAL SIGNAL MULTIPLEXING APPARATUS AND DEMULTIPLEXING APPARATUS

[75] Inventors: Yuji Obana, Mibu; Masanori Hiramoto, Yuhki; Masayuki Tanaka, Ashikaga, all of Japan

[73] Assignee: Fujitsu Limited, Kanagawa, Japan

[21] Appl. No.: 576,467

[22] PCT Filed: Jan. 8, 1990

[86] PCT No.: PCT/JP90/00011
§ 371 Date: Sep. 7, 1990
§ 102(e) Date: Sep. 7, 1990

[87] PCT Pub. No.: WO90/07829
PCT Pub. Date: Jul. 12, 1990

[30] Foreign Application Priority Data
Jan. 9, 1989 [JP] Japan .................................. 1-3338
Feb. 8, 1989 [JP] Japan .................................. 1-27485
Feb. 23, 1989 [JP] Japan .................................. 1-41591

[51] Int. Cl.$^5$ .............................................. H04J 3/04
[52] U.S. Cl. ................................. 370/112; 370/110.1; 370/105.4
[58] Field of Search ............ 370/112, 105.1, 105.4, 370/106, 67, 110.1; 375/114, 116

[56] References Cited
U.S. PATENT DOCUMENTS

| | | | |
|---|---|---|---|
| 4,052,566 | 10/1977 | MacKay | 370/112 |
| 4,313,193 | 1/1982 | Nakano et al. | 370/112 |
| 4,675,861 | 6/1987 | Uttermark | 370/112 |
| 4,744,082 | 3/1988 | Fujimura et al. | 370/112 |
| 4,899,339 | 2/1990 | Shibagaki et al. | 370/112 |
| 4,920,535 | 4/1990 | Watanabe et al. | 370/105.4 |
| 4,984,238 | 1/1991 | Watanabe et al. | 370/105.1 |

Primary Examiner—Douglas W. Olms
Assistant Examiner—H. Kizou
Attorney, Agent, or Firm—Nikaido, Marmelstein, Murray & Oram

[57] ABSTRACT

A digital signal multiplexing apparatus has n (n is an arbitrary integer) multiplexing circuits (11-1n) for converting input signals from a plurality of lines into m (m is an arbitrary integer) parallel signals which are added with added bits and have a first transmission speed. A parallel-serial conversion circuit (40) converts the m parallel signals from the n multiplexing circuits into a serial multiplexed signal by a parallel-serial conversion. A bus (30) connects the n multiplexing circuits and the parallel-serial conversion circuit. The n multiplexing circuits respectively have a circuit for successively transmitting the m parallel signals to the bus using a pluse signal having a second transmission speed which is n times the first transmission speed. A digital signal demultiplexing circuit has a serial-parallel conversion circuit (75) for converting a serial input signal into m (m is an arbitrary integer) parallel signals having a predetermined transmission speed. N (n is an arbitrary integer) demultiplexing circuits (51-5n) demultiplexes added bits from the m parallel signals from the serial-parallel conversion circuit (75) and outputs the added bits on a plurality of lines with the predetermined transmission speed. A bus connects the serial-parallel conversion circuit and the n demultiplexing circuit (75). The n demultiplexing circuits respectively have a circuit for receiving the m parallel signals output on the bus from the serial-parallel conversion circuit with a clock timing of a speed identical to the predetermined transmission speed.

19 Claims, 19 Drawing Sheets

DIGITAL SIGNAL MULTIPLEXING APPARATUS AND DEMULTIPLEXING APPARATUS

TECHNICAL FIELD

The present invention generally relates to digital signal multiplexing apparatuses and demultiplexing apparatuses, and more particularly to a digital signal multiplexing apparatus for byte-multiplexing a high-speed digital signal and for transmitting a multiplexed signal, and a demultiplexing apparatus for demultiplexing the multiplexed signal and for outputting a high-speed digital signal.

BACKGROUND ART

A system is known in which transmission and reception of a high-speed digital signal are made using a synchronous communication network which uses optical fiber cables. In such a synchronous communication network, an oscillator is provided to generate a main clock within the system. This main clock is used in common on the transmitter end and the receiver end. Normally, a plurality of input signals are subjected to a hierarchical multiplexing process a plurality of times and converted into a high-speed multiplexed signal which is transmitted. The input signals are multiplexed in bytes. The signal speed increases every time the multiplexing takes place. For this reason, a circuit which operates at a high speed is necessary to carry out the multiplexing. Heat generated by a circuit which operates at the high speed is large, and the large heat generation makes it difficult to reduce the size of the equipment. Accordingly, in order to minimize the circuit scale, it is necessary to reduce the circuit parts which operate at the high speed and reduce the power consumption.

The SONET (synchronous optical network) is known as a high-speed transmission network using byte multiplexing. As shown in FIG. 1, an STS-1 signal of the SONET system has 8 bits in one byte and forms one frame in 90 bytes×9 columns×8 bits=6480 bits. One frame is 125 μs, and the bit rate is 51.84 MHz. A frame format of the STS-1 signal shown in FIG. 1 is formed for every channel. 2 bytes at the head of the frame format are frame synchronizing patterns A1 and A2, and next one byte is a channel identification pattern C1. SOH (section overhead), LOH (line overhead) and POH (path overhead) are control data added to the information which is to be transmitted.

The plurality of STS-1 signals having the above described frame format are simply byte-multiplexed (no format conversion is made). FIG. 2 shows the byte multiplexing of 3 STS-1 signals. The STS-1 signals of the 3 S channels #1, #2 and #3 are byte-multiplexed to generate an STS-3 signal of 155.52 MHz. This STS-3 signal is standardized as an STM-1 signal according to the CCITT Recommendations. It is assumed that the STS-1 signals are transmitted as optical signals. The two bytes of frame synchronizing patterns A1 and A2 and one byte of channel identification pattern C1 are added to the head of the data of the three channels #1 through #3, and the STS-3 signal is formed by the byte multiplexing as indicated by dotted arrows. In this case, since insertion of the frame pattern or the like is not made as the STS-3 signal and the byte multiplexing is carried out so that the heads the channels #1 through #3 match, a frame multiplexed synchronizing pattern of the STS-3 signal is formed of six bytes.

In addition, the frame synchronizing patterns A1 and A2 of each of the channels #1 through #3 are the same, and patterns A1="11110110" and A2="00101000" are used. Further, the channel identification pattern C1 is selected to mutually different patterns among the channels #1 through #3.

Returning to FIG. 1, B1 through B3 are byte interleaving parities, C2 is a signal label byte indicating the existence/non-existence of information, D1 through D12 are data communication bytes for transferring status information or the like between equipment, E1 and E2 are order wire bytes, F1 and F2 are user channel bytes, G1 is a path status byte for detecting a parity error of a reception signal and for returning it to a far end equipment, H1 and H2 are pointers having variable slot function for fetching an asynchronous system, H3 is a pointer having variable slot function in stuffing, H4 is a multiframe indication byte, J1 is a trace byte, K1 and K2 are automatic protection switch bytes, and Z1 through Z5 are spare bytes.

On the receiver end, the frame synchronization is achieved by detecting the 6-byte frame multiplexed synchronizing pattern of the STS-3 signal shown in FIG. 2. As indicated by the dotted arrows, the data are demultiplexed into the data of the channels #1 through #3, and the channel identification pattern C1 is used to detect whether or not the multiplexing and demultiplexing are made correctly.

In addition, it is also possible to further multiplex a plurality of STS-1 signals. In this case, the frame synchronizing patterns A1 and A2 and the channel identification pattern C1 at the head of the STS-1 signal are also byte-multiplexed to the head of the frame of the n multiplexed STS-n signal. The frame multiplexed synchronizing pattern which is added to the head of the STS-n signal in this case is formed of 2n bytes.

FIG. 3 is a block diagram showing a conventional digital signal multiplexing apparatus of the SONET system. The digital signal multiplexing apparatus shown has first through third multiplexing circuits 1 through 3, a multiplexing conversion circuit 5, a scrambler 6 and a parallel-serial conversion circuit 7. The first multiplexing circuit 1 multiplexes input signals 1. The input signals 1 are a group of signals from 28 subscriber's lines, for example. Input signals 2 and 3 which are supplied to the second and third multiplexing circuits 2 and 3 are similar to the input signals 1. The signals on each of the subscriber's lines are digitized. The first multiplexing circuit 1 multiplexes 28 digital signals of the input signals 1 in a multiplexer using a sub clock of 51.84 MHz, and makes a format conversion in a format converter to obtain the STS-1 signal. The STS-1 signals from the first through third multiplexing circuits 1 through 3 are supplied to an STS-3 multiplexing circuit 5 so as to obtain the STS-3 signal by a byte multiplexing. The STS-3 multiplexing circuit 5 has a multiplexing conversion circuit 6 for carrying out the byte multiplexing. The multiplexing conversion circuit 6 has serial-parallel converters 5-1 through 5-3, a parallel-parallel converter 5-4 and a scrambler 5-5. The STS-1 signals from the first through third multiplexing circuits 1 through 3 are converted into 8-bit (1-byte) parallel signals by the serial-parallel converters 5-1 through 5-3 using a clock signal of 6.48 Mbps and supplied to the parallel-parallel converter 5-4. The parallel-parallel converter 5-4 converts the 8-bit parallel signals from the first through third multiplexing circuits 1 through 3 into a 24-bit parallel signal, converts this 24-bit parallel signal into an 8-bit parallel signal using a clock of 19.44 Mbps and supplies the 8-bit parallel signal to the scrambler 5-5. In other words, the serial-parallel converters 5-1 through 5-3 and the parallel-parallel converter 5-4 are used to byte-multiplex the STS-1 signals. The scrambler 5-5 generates a pseudo random pattern from the main clock and scrambles the 8-bit parallel signal using the pseudo random pattern, so as to prevent a continuous generation of data "0" or "1" within the 8-bit parallel signal. In other words, the scrambler 5-5 adds the pseudo random pattern to the 8-bit parallel signal. The parallel-serial conversion circuit 7 multiplexes the scrambled 8-bit parallel signal in bytes and converts the signal into a serial signal of 155.52 MHz. This serial signal corresponds to the STS-3 signal described above. The serial signal is converted into an optical signal in an electric-optic converter which is not shown and is transmitted on an optical fiber.

Normally, the first through third multiplexing circuits 1 through 3 are independently made in the form of LSIs. The parallel-serial conversion circuit 7 is also made in the form of an LSI. The multiplexing conversion circuit 6 is integrated in the form of an LSI. Accordingly, the structure shown in FIG. 3 is made up of five LIS chips. Since the parallel-serial conversion circuit 7 operates at a high speed, the LSI of the parallel-serial conversion circuit 7 is ECL based while the LSIs of the remaining circuits are CMOS based.

However, the conventional circuit structure shown in FIG. 3 have the following problems. First, the scale of the apparatus is large. This is due to the fact that the multiplexing conversion circuit 5 is used to byte-multiplex the three STS-1 signals of 51.84 MHz to form the 8-bit parallel signal of 19.44 MHz. Originally, 155.5 MHz is obtained when the three STS-1 signals (51.84 MHz) are simply multiplexed, but this cannot be achieved by the LSI having the CMOS structure. Normally, the CMOS LSI can operate stably only up to approximately 50 MHz. But on the other hand, there is a demand to use the CMOS LSI as much as possible from the point of view of the power consumption and circuit scale. Hence, in order to satisfy this demand, the multiplexing conversion circuit 5 having the above-described structure is used to multiplex the STS-1 signals by the CMOS operation. However, the use of the multiplexing conversion circuit 5 makes the scale of the apparatus large.

Second, although the first through third multiplexing circuits 1 through 3 are made of the CMOS LSIs, these circuits process the signals of 51.84 MHz. As described above, the limit for ensuring stable operation on the CMOS LSI is approximately 50 MHz. For this reason, it is undesirable that the first through third multiplexing circuits 1 through 3 operate in a region exceeding the stable operating region.

On the other hand, the structure on the receiver end also has following problems. As described above, the frame multiplexed synchronizing pattern of the STS-n signal (n≧3) has the 2n byte structure. Hence, it is necessary to employ a 2n byte pattern detection in order to detect the frame synchronization. As a result, there are problems in that the scale of the circuit becomes large as the multiplexing factor becomes large and the pull-in time of the synchronization becomes long. In addition, a synchronization error easily occurs due to the transmission error, and it is therefore necessary to increase the number of protection stages.

DISCLOSURE OF THE INVENTION

It is a general object of the present invention to provide a novel and useful digital signal multiplexing apparatus and demultiplexing apparatus in which the problems described above are eliminated.

More particularly, it is an object of the present invention to reduce the power consumption by reducing the circuit parts which operate at a high speed on the transmitter end, so as to minimize the scale of the circuit and enable large scale integration.

This object is achieved by a digital signal multiplexing signal comprising n (n is an arbitrary integer) multiplexing devices for converting input signals from a plurality of lines into m (m is an arbitrary integer) parallel signals which are added with added bits and have a first transmission speed, parallel-serial conversion devices for converting the m parallel signals from the n multiplexing means into a serial multiplexed signal by a parallel-serial conversion, and a bus for connecting the n multiplexing device and the parallel-serial conversion device, wherein the n multiplexing device respectively have means for successively transmitting the m parallel signals to the bus using a pulse signal having a second transmission speed which is n times the first transmission speed.

Another object of the present invention is to reduce the scale of the apparatus, reduce the power consumption and enable large scale integration on the receiver end.

This object is achieved by a digital signal demultiplexing apparatus comprising serial-parallel conversion device for converting a serial input signal into m (m is an arbitrary integer) parallel signals having a predetermined transmission speed, n (n is an arbitrary integer) demultiplexing device for demultiplexing added bits from the m parallel signals from serial-parallel conversion devices and for outputting the added bits on a plurality of lines with the predetermined transmission speed, and a bus for connecting the serial-parallel conversion device and the n demultiplexing device, wherein the n demultiplexing devices respectively have a device for fetching the m parallel signals output on the bus from the serial-parallel conversion means with a clock timing of a speed identical to the predetermined transmission speed.

The above described object is also achieved by a digital signal demultiplexing apparatus which demultiplexes a serial multiplexed signal having at a header thereof a frame multiplexed synchronizing pattern in which a 2-byte frame synchronizing pattern and a 1-byte demultiplexing circuit identification pattern which are prescribed for each demultiplexing circuit are byte-multiplexed, and comprises a detection devices for outputting a detection signal by detecting from the multiplexed signal the frame synchronizing pattern corresponding to one demultiplexing circuit and timing generation devices for generating a timing signal based on the detection signal from the detection devices, wherein the n demultiplexing circuits respectively have demultiplexing circuit identification pattern detection devices for detecting the demultiplexing circuit identification pattern from the multiplexed signal based on the timing signal from the timing generation devices and n demultiplexing devices for demultiplexing their own data from the multiplexed signal based on their own demultiplexing circuit identification pattern which is detected.

Furthermore, another object of the present invention is to provide a digital multiplexing and demultiplexing apparatus having the above described digital signal multiplexing apparatus and the above described digital signal demultiplexing apparatus.

BEST MODE OF CARRYING OUT THE INVENTION

Figure 4:
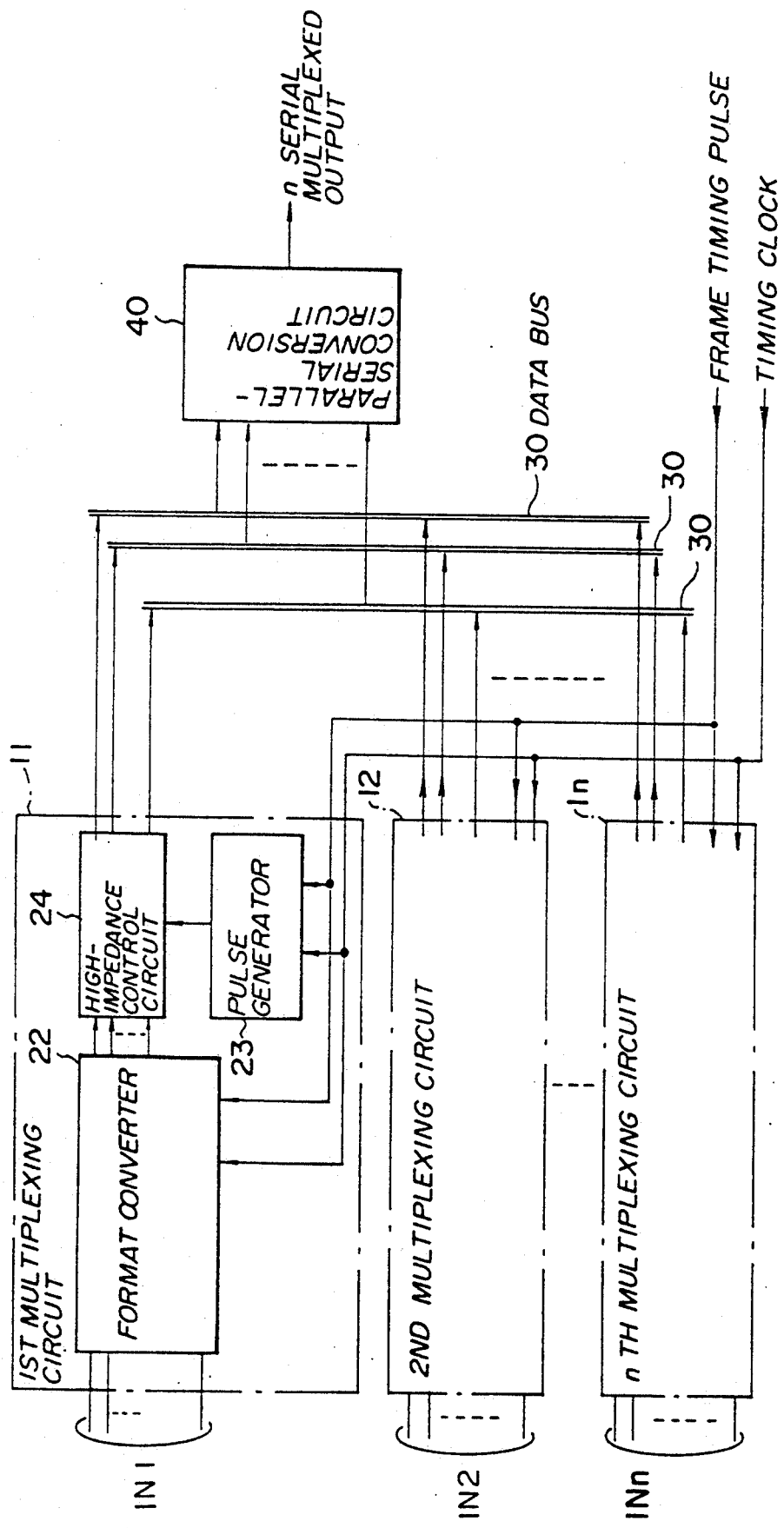
FIG. 4 is a block diagram showing a first embodiment of the present invention.

FIG. 4 is a block diagram showing the structure in principle of a first embodiment of a digital signal multiplexing apparatus according to the present invention. The digital signal multiplexing apparatus shown has first through nth multiplexing circuits 11 through ln, a data bus 30 and a parallel-serial conversion circuit 40. The first through nth multiplexing circuits 11 through ln respectively subject incoming m parallel signals to a time division into n intervals and concentrates the signals by multiplexing the signals on the data bus 30. The first multiplexing circuit 11 has a format converter 22, a pulse generator 23 and a high impedance control circuit 24. The first multiplexing circuit 11 composes a pseudo signal to the incoming m parallel data by adding a timing clock which controls the circuit operation and a frame timing pulse which indicates the head of an input signal (the m parallel signals are generated from this) which is applied to the format converter 22. The pulse generator 23 inputs the frame timing pulse and the timing clock and generates a control pulse for subjecting the m parallel signals to the time division into n intervals. The high impedance control circuit 24 inputs the control pulse from the pulse generator 23 and passes the incoming m parallel signals from the format converter 22 only with a timing of the interval assigned to itself from among the n intervals and outputs the passed m parallel signals on the data bus 30. The data bus 30 carries out a multiplexing in which the time division signals of the n intervals output from the high impedance control circuit 24 are concentrated serially into m serial signals. The second through nth multiplexing circuits 12 through ln have structures similar to that of the first multiplexing circuit 11. As will be described later, the format converter 22 also has a scrambler function, and scrambling is carried out beforehand in each of the multiplexing circuits 11 through 13 when making the format conversion, so that the result becomes the same as scrambling N serial outputs which are obtained by carrying out the conventional byte multiplexing when carrying out the byte multiplexing in a latter stage.

By the structure shown in FIG. 4, the m parallel signals which are subjected to the time division into the n intervals and output from the high impedance control circuit 24 can be multiplexed by concentrating the signals on the data bus 30, and the multiplexing circuit can be designed to have a reduced number of circuits which operate at a high speed followed by the n multiplexing.

Figure 5:
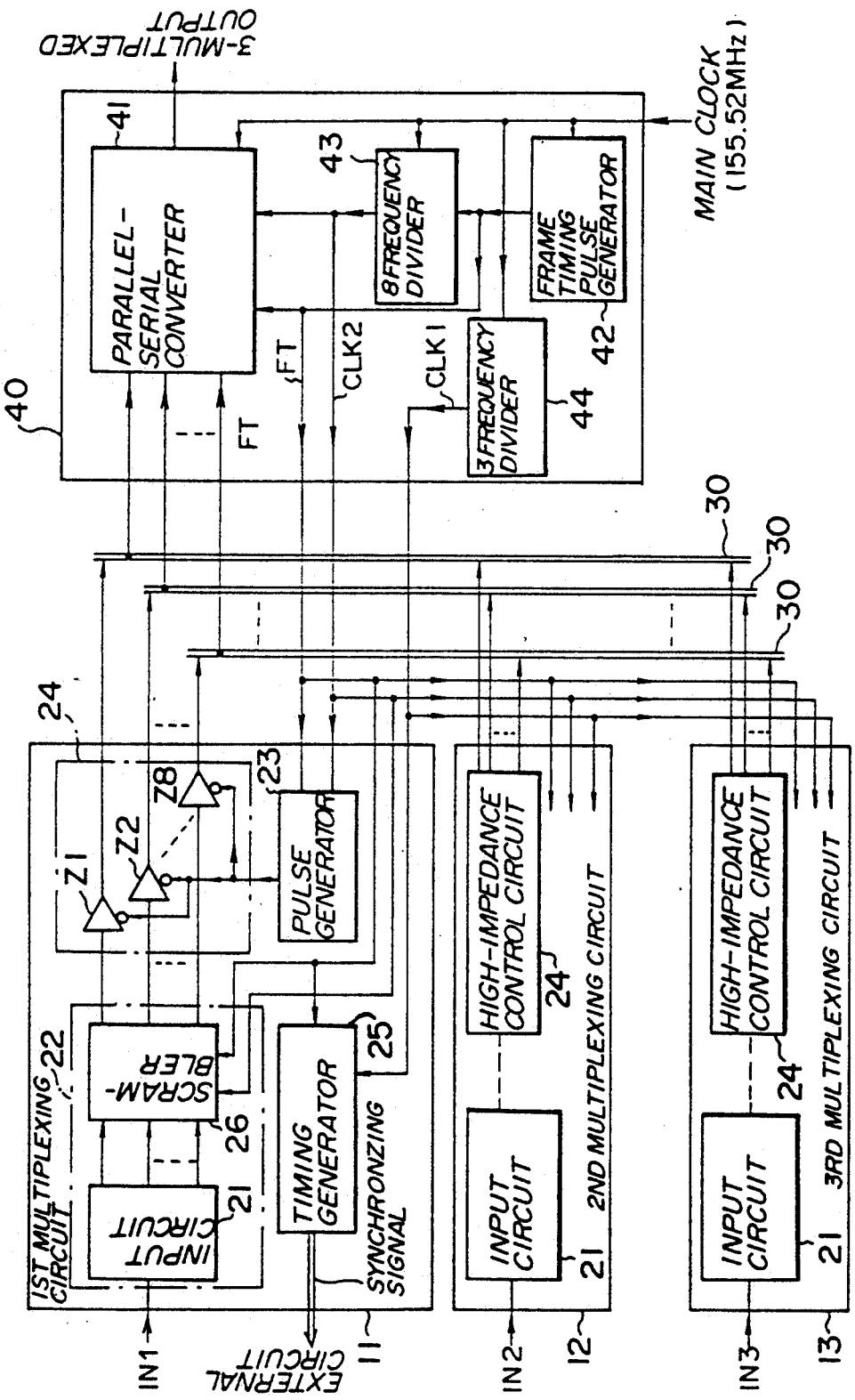
FIG. 5 is a block diagram showing the first embodiment of the present invention in more detail.

FIG. 5 shows the structure of the digital signal multiplexing apparatus in more detail. In FIG. 5, those parts which are the same as those parts of FIG. 4 are designated by the same reference numerals. The structure shown is for the case where n=3. The first through third multiplexing circuits 11 through 13 have the same structure, and each has a format converter 22 which is made up of an input circuit 21 and a scrambler 26, a pulse generator 23 for generating a control pulse, a high impedance control circuit 24 made up of 8 ON/OFF elements Z1 through Z8, and a timing generator 25. A serial-parallel conversion circuit 40 has a parallel-serial converter 41, a frame timing pulse generator 42, 8 frequency divider 43, and 3 frequency divider 44. Input signals IN1 through IN3 are respectively applied to the first through third multiplexing circuits 11 through 13.

Figure 1:
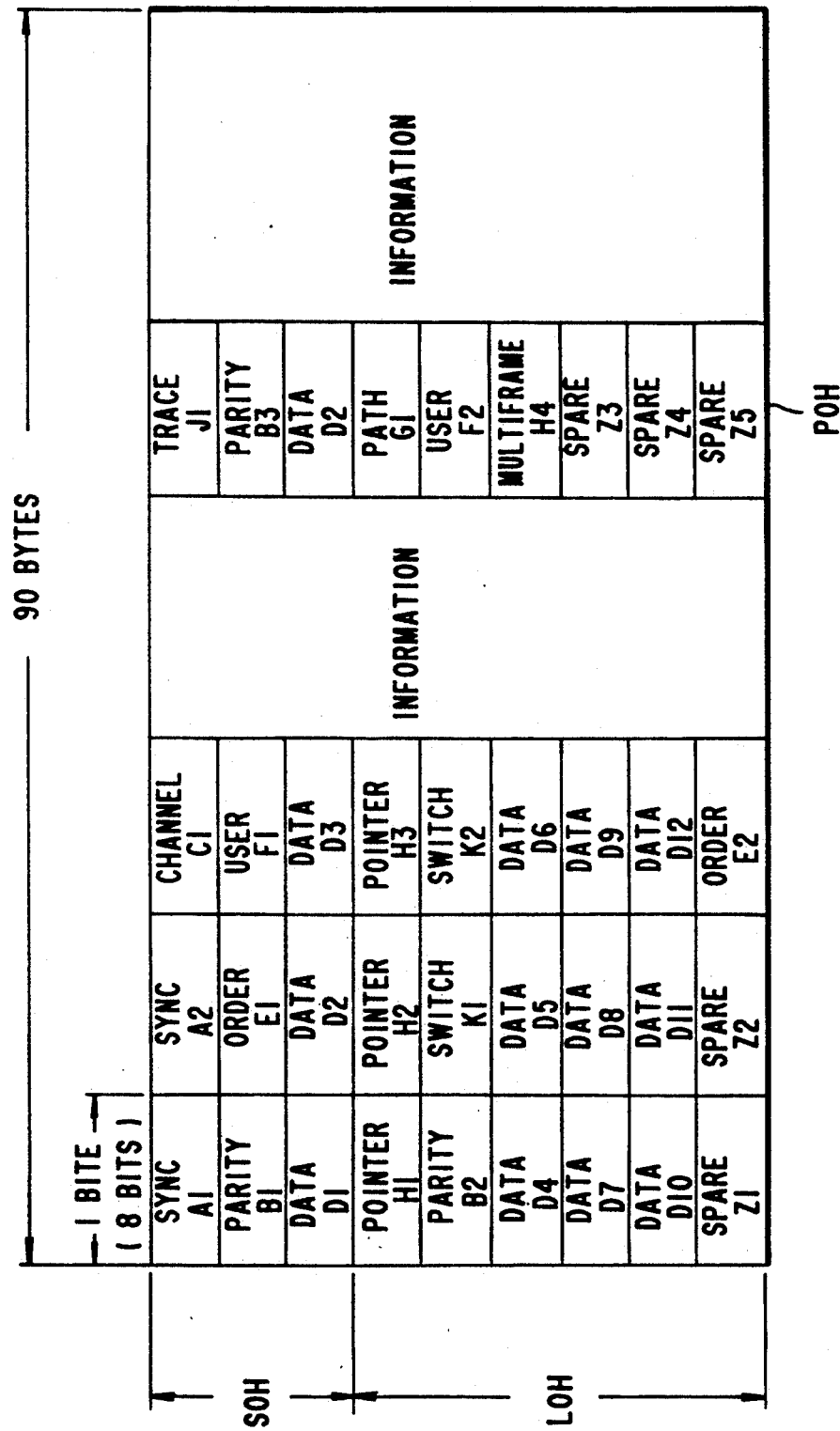
FIG. 1 is a diagram showing an STS-1 signal frame.

Each of the input signals IN1 through IN3 are made up of a group of a plurality of signals obtained from 28 lines as in the conventional case, for example. The input circuit 21 of each of the first through third multiplexing circuits 11 through 13 inserts the frame timing pulse, the circuit control pulse and the like, and converts the data having the frame structure shown in FIG. 1 into an 8-bit (1-byte) parallel signal. scrambler 26 scrambles the 8-bit parallel signal and outputs a scrambled 8-bit parallel signal. The 8-bit parallel signal output from the scrambler 26 is divided into 3 intervals in the high impedance control circuit 24. The 3 divided 8-bit parallel signals are subjected to an ON/OFF control in the ON/OFF elements Z1 through Z8 and are multiplexed by being concentrated on the data bus 30. The multiplexed signals (corresponding to STS-1 signals) which are output from the first through third multiplexing circuits 11 through 13 are supplied to the parallel-serial converter 41.

Figure 2:
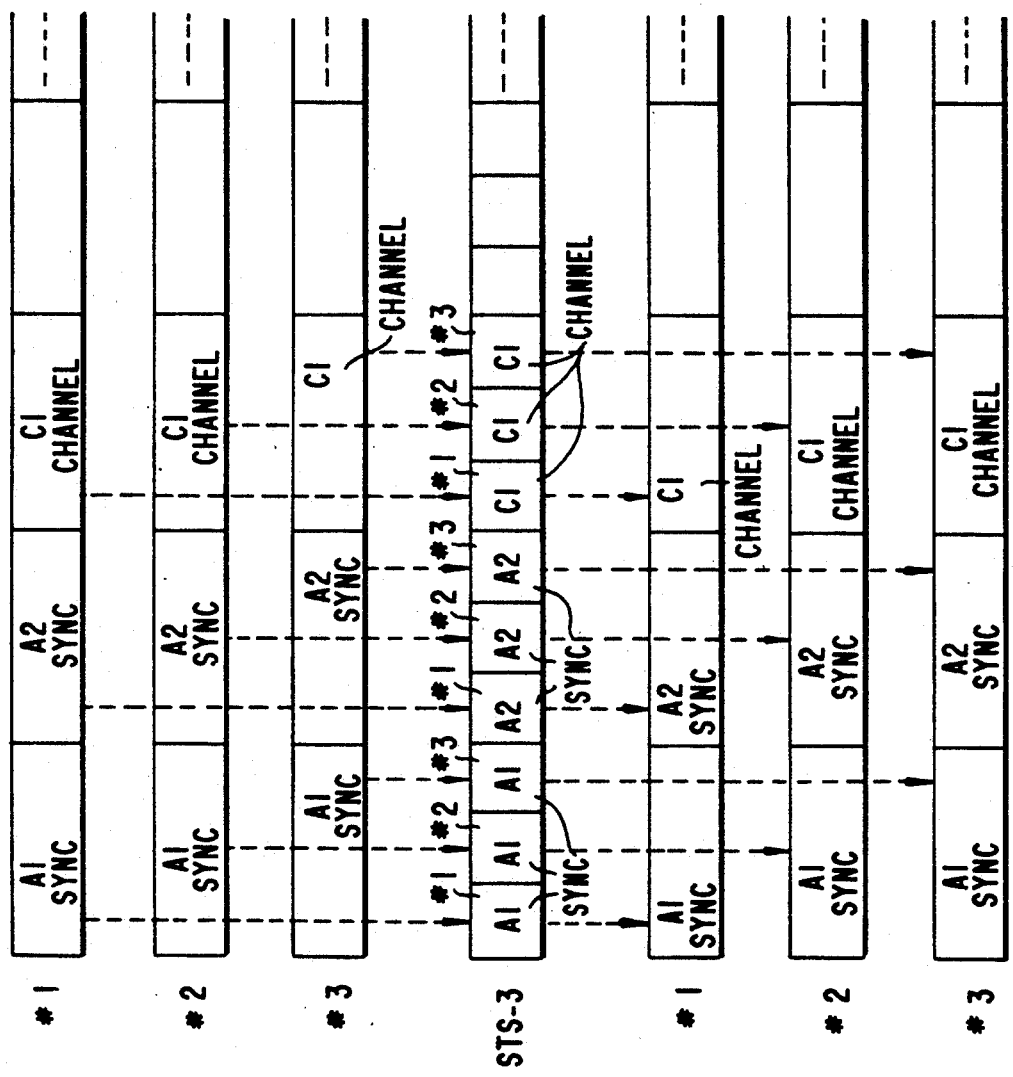
FIG. 2 is a diagram for explaining an STS-3 signal.
Figure 3:
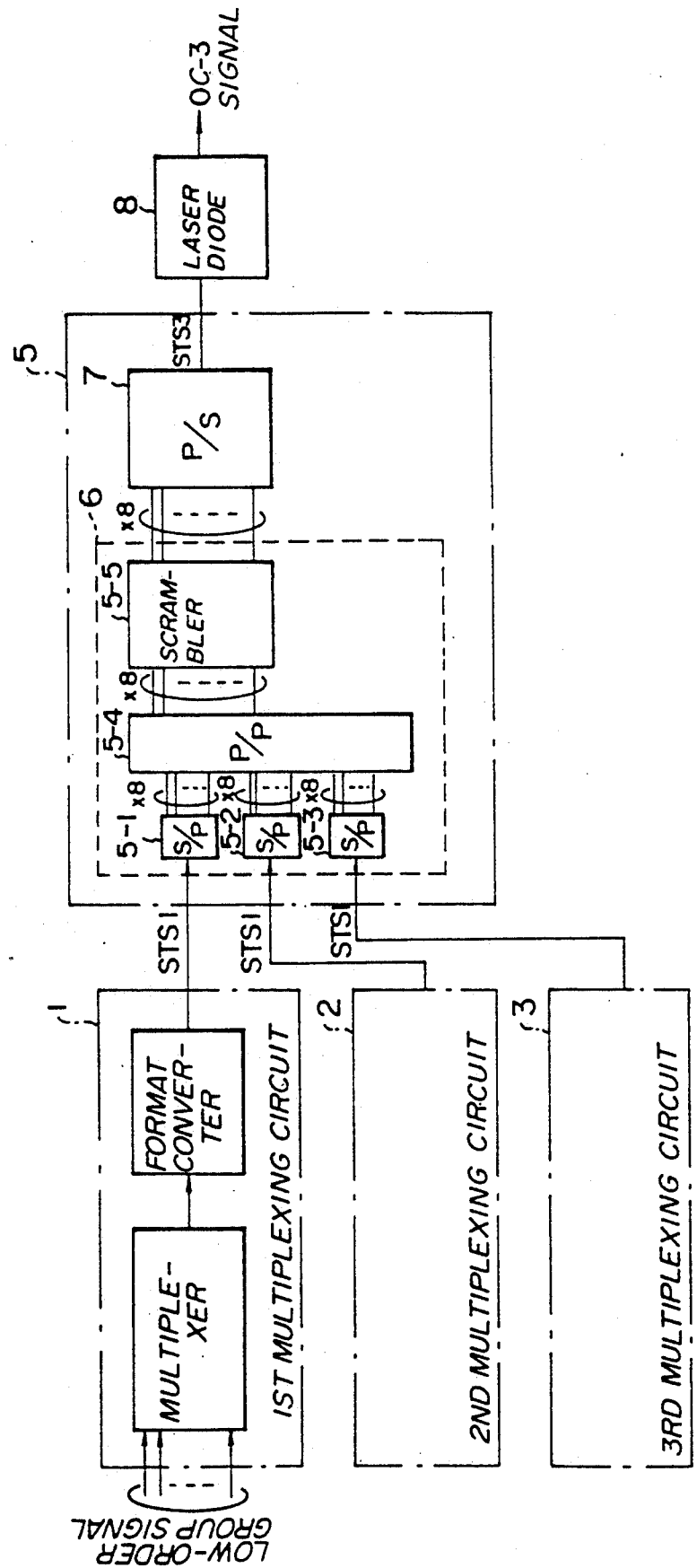
FIG. 3 is a block diagram showing a conventional digital signal multiplexing apparatus.

In this embodiment, there is no need to subject the multiplexed signal to the byte multiplexing again in the multiplexing conversion circuit 6 (FIG. 3) as in the conventional case. In other words, this embodiment has a circuit structure which does not have the multiplexing conversion circuit 6 for remultiplexing the 3 multiplexing. For this reason, the 8-bit parallel signal is divided into 3 with the speed as it is and composed as they are by concentrating on the data bus 30. Accordingly, the first through third multiplexing circuits 11 through 13 need only have 8 output lines, and 8 output lines are reduced compared to 24 lines conventionally required for the 3 multiplexing. A more detailed description will be now given in conjunction with FIGS. 6 and 7 with reference to FIG. 2.

Figure 6:
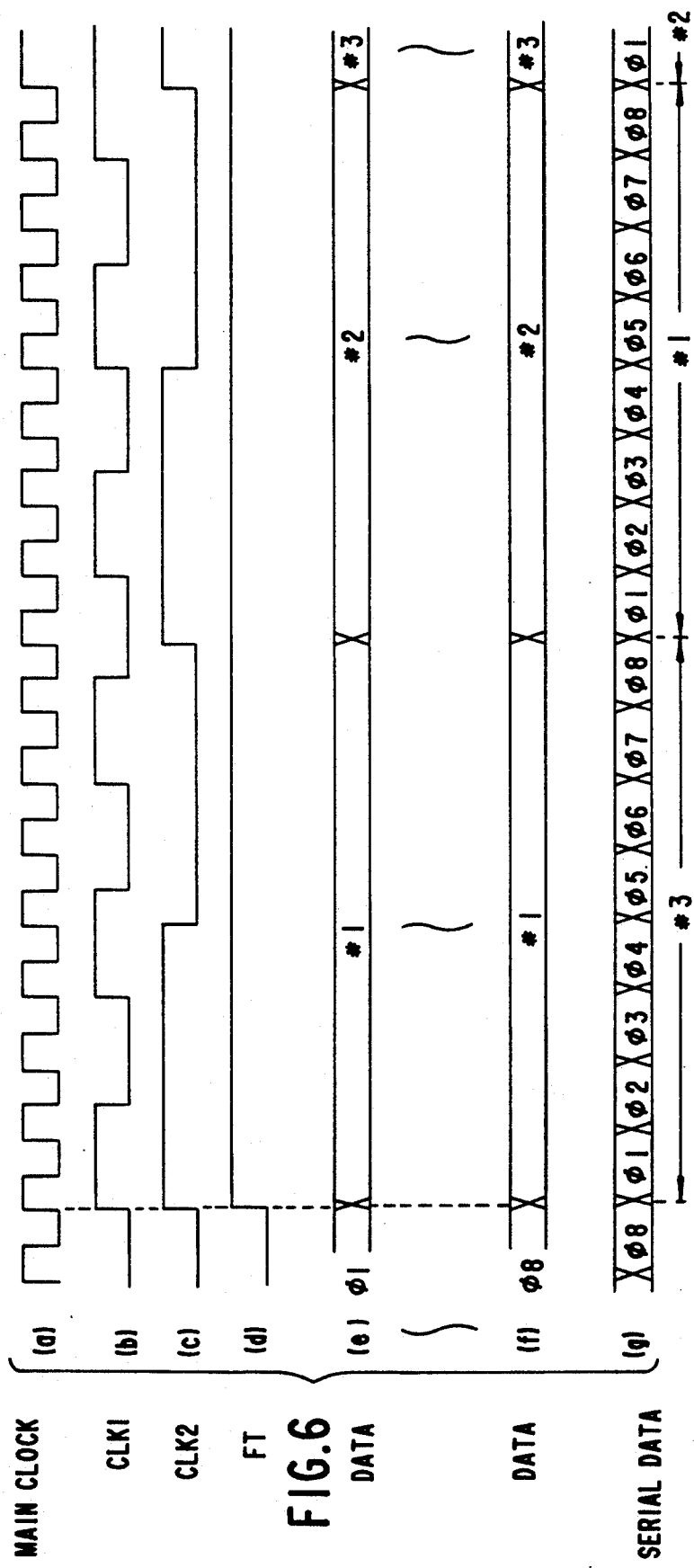
FIG. 6 is a timing diagram showing an operation of a parallel-serial conversion circuit shown in FIGS. 4 and 5.
Figure 7:
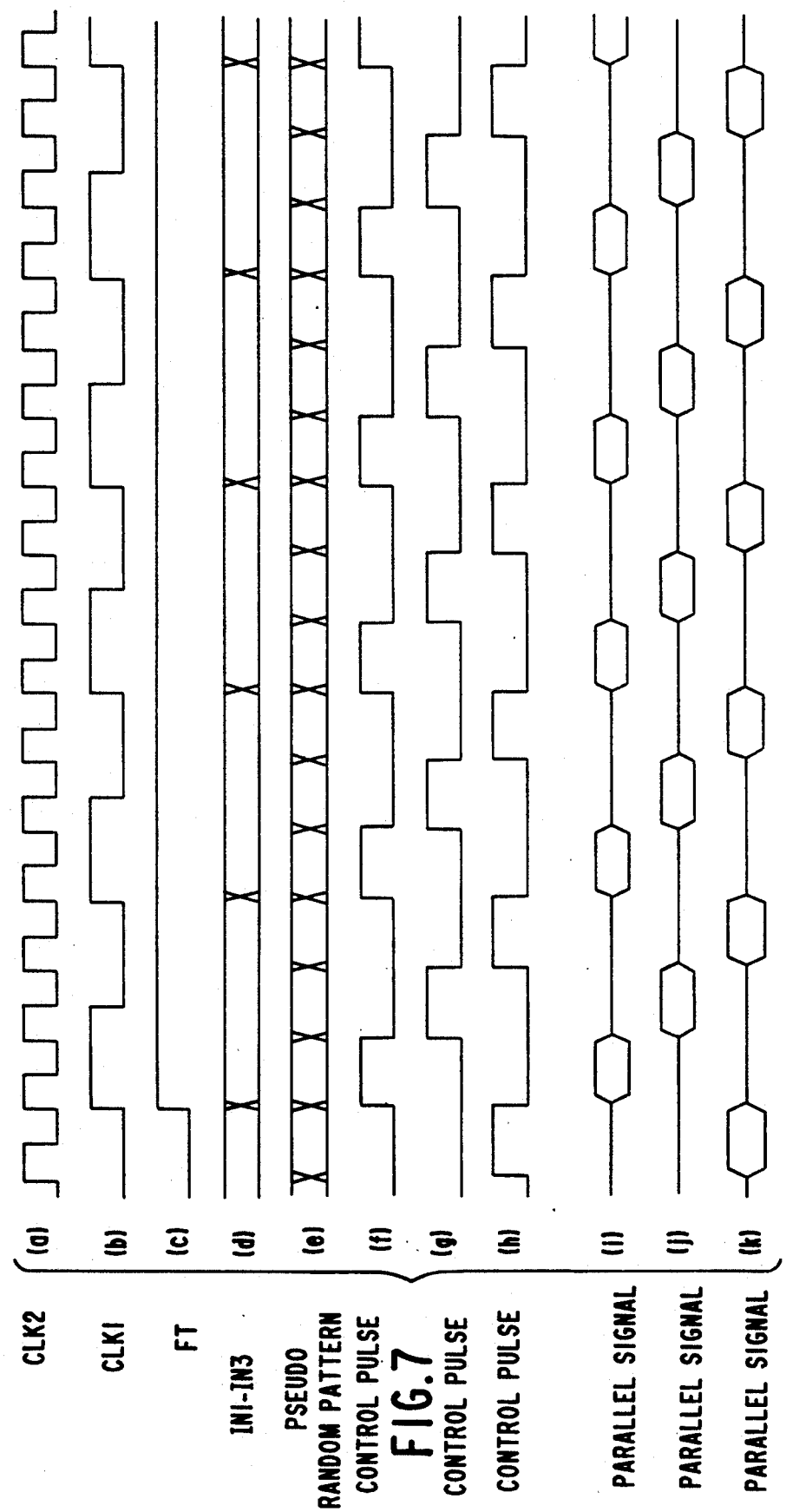
FIG. 7 is a timing diagram showing operations of first through third multiplexing circuits shown in FIGS. 4 and 5.

FIG. 6 is a timing diagram of signals within the serial-parallel conversion circuit 40, and FIG. 7 is a timing diagram of signals within the first through third multiplexing circuits 11 through 13.

A main clock of 155.52 MHz shown in FIG. 6(a) is input to the parallel-serial conversion circuit 40. The 3 frequency divider 44 generates a clock CLK1 of 51.84 MHz shown in FIG. 6(b), and the 8 frequency divider 43 generates a clock CLK2 of 19.44 MHz shown in FIG. 6(c). Further, the frame timing pulse generator 42 generates a frame timing pulse FT shown in FIG. 6(d). The clock CLK1 of 51.84 MHz, the clock CLK2 of 19.44 MHz and the frame timing pulse FT are input to the first through third multiplexing circuits 11 through 13.

Next, the first through third multiplexing circuits 11 through 13 supplies the clock CLK1 of 51.84 MHz shown in FIG. 6(b) and the frame timing pulse FT shown in FIG. 7(c) (identical to that of FIG. 6(d)) to the timing generator 25, and supplies to an external circuit (not shown) a synchronizing signal of 6.48 MHz which is synchronized to the head of the frame timing pulse, so that the input signals IN1 through IN3 supplied to the input circuits 21 are controlled and synchronized to the synchronizing signal of 6.48 MHz. The input signals IN1 through IN3 which are supplied to the respective input circuits 21 are converted into 8-bit parallel signals and the data shown in FIG. 7(d) are output from the input circuits 21. The 8-bit parallel signals are supplied to the scramblers 22 together with the clock CLK2 of 19.44 MHz shown in FIG. 7(a) and the frame timing pulse FT shown in FIG. 7(c) so as to compose input signals shown in FIG. 7(d) and a pseudo random pattern shown in FIG. 7(e), and the composed outputs are supplied to high impedance control circuits 24.

In this state, the pulse generators 23 of the first through third multiplexing circuits 11 through 13 input the clock CLK2 of 19.44 MHz shown in FIG. 7(a) and the frame timing pulse FT shown in FIG. 7(c), and respectively generate control pulses shown in FIG. 7(f) through (h). The control pulses is used for controlling the high impedance control circuit 24 so that 3 intervals are formed by dividing one cycle having the frequency of 6.48 MHz into 3 (number of channels or number of multiplexing circuits) and the 3 intervals are assigned to the first through third multiplexing circuits 11 through 13 so that the data from the scramblers 26 are passed only during the assigned intervals. The ON/OFF elements Z1 through Z8 provided in the high impedance control circuit 24 turn ON when a high-level output is obtained from the pulse generator 23 and pass the output data of the scrambler 26 onto the data bus 30 only during one of the 3 intervals assigned thereto. On the contrary, the ON/OFF elements Z1 through Z8 turn OFF when a low-level output is obtained from the pulse generator 23 to block the output data of the scrambler 26 from passing. Accordingly, the outputs of the high impedance control circuits 24 of the first through third multiplexing circuits 11 through 13 are processed to the 8-bit parallel signals which are time-divided into 3 intervals as shown in FIG. 7(i) through (k) and are concentrated on the data bus 30. The 8-bit parallel signals which are concentrated on the data bus 30 are respectively divided into 3 and successively arranged serially in the order #1, #2 and #3 and supplied to the parallel-serial converter 41 of the parallel-serial conversion circuit 40 in the form of 8-bit parallel signals (data) $\phi 1$ through $\phi 8$.

The parallel-serial converter 41 operates in response to the clock CLK2 of 19.44 MHz shown in FIG. 6(c) and the frame timing pulse FT shown in FIG. 6(d). The parallel-serial converter 41 inputs the data shown in FIG. 6(e) in which the data are successively arranged serially in the order #1, #2 and #3, and transmits a 3 multiplexed output which is a serial data shown in FIG. 6(g) in which the data $\phi 1$ through $\phi 8$ are serially arranged in the order #3, #1 and #2.

The structure shown in FIG. 5 can be realized by a total of 4 LSIs which include 3 CMOS LSIs forming the first through third multiplexing circuits 11 through 13 and 1 ECL LSI forming the parallel-serial conversion circuit 40. Hence, it is possible to reduce the scale of the multiplexing circuit which needs to operate at the high speed. Accordingly, it is possible to suppress the heat generation and design the circuit to use a large scale integrated circuit which operates at a higher speed.

The first embodiment described above use three multiplexing circuits (first through multiplexing circuits 11 through 13). However, the present invention is not limited to 3 multiplexing. In other words, n can be set to an arbitrary value. In this case, the input signal of each of the n multiplexing circuits divides 1 cycle of the input signal with a frequency which is n (number of channels, that is, number of multiplexing circuits) times that of the input signal. For example, when n=6, 1 cycle is divided with a frequency of 38.88 MHz (6.48 MHz×6). In addition, the signals output on the data bus 30 are subjected to the parallel-serial conversion with a clock having the transmission speed (311.04 MHz).

Next, a description will be given of a second embodiment of the present invention. This second embodiment relates to the demultiplexing of the digital signal.

Figure 8:
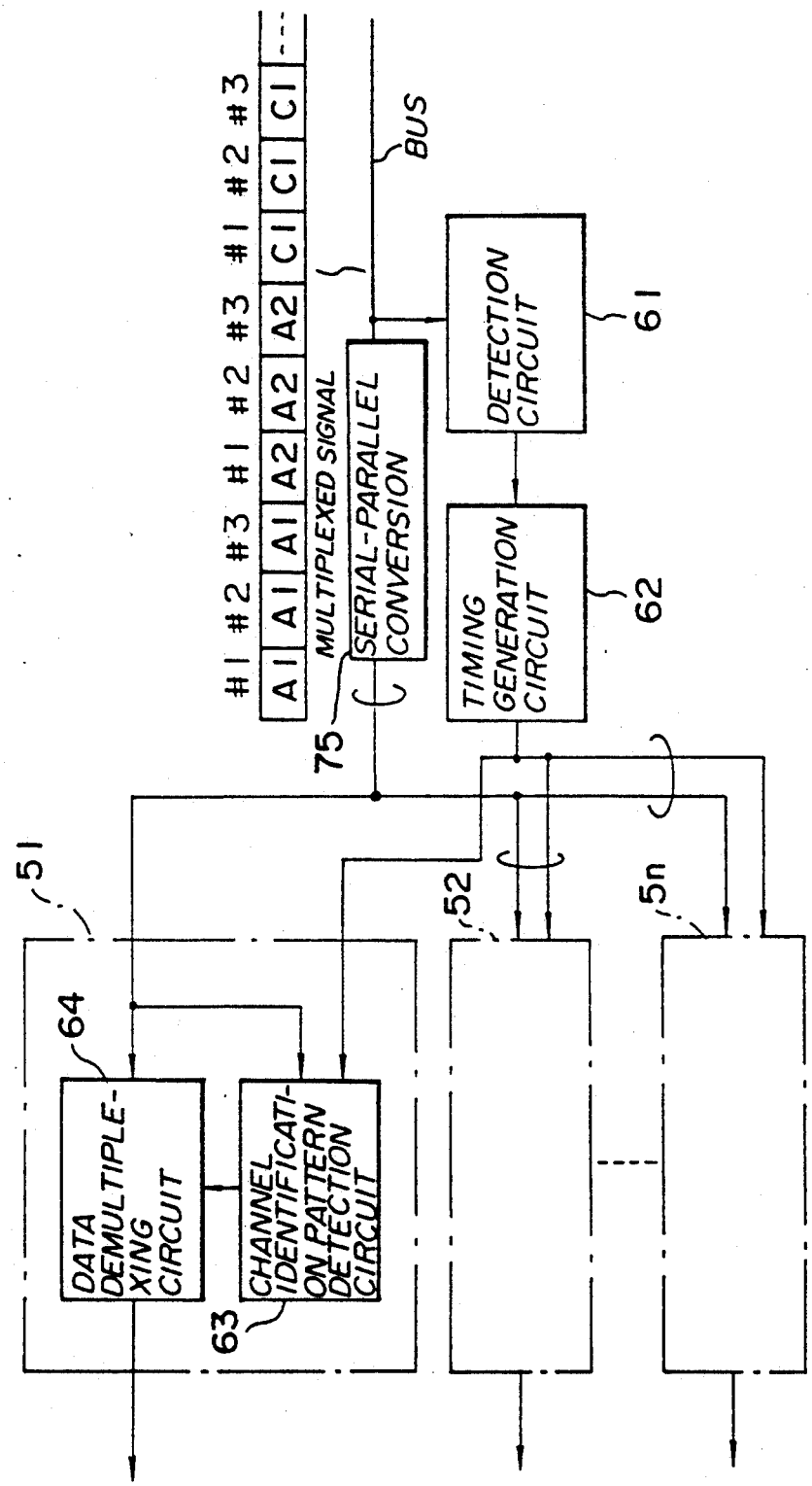
FIG. 8 is a block diagram showing a second embodiment of the present invention.

FIG. 8 shows the structure in principle of the second embodiment of a digital signal demultiplexing apparatus according to the present invention. In FIG. 8, a detection circuit 61 detects the frame synchronizing patterns A1 and A1 amounting to 1 channel (corresponding to 1 demultiplexing circuit) within the multiplexed signal (STS-3 signal) in which 2 bytes of frame synchronizing patterns A1 and A2 of the corresponding channel (corresponding demultiplexing apparatus) and 1 byte of channel identification pattern (also called demultiplexing circuit identification pattern) C1 are byte-multiplexed. A timing generation circuit 62 generates a timing signal based on a frame synchronizing pattern detection signal from the detection circuit 61. A serial-parallel converter 75 converts the input serial signal shown into parallel signals in units of bytes (8 bits) using the signal from the detection circuit 61, and supplies the parallel signals to n demultiplexing circuits 51 through 5n via a bus. The n demultiplexing circuits 51 through 5n respectively have a channel identification pattern detection circuit 63 which detects the channel identification pattern C1 from the multiplexed signal based on the timing signal from the timing generation circuit 62 and a data demultiplexing circuit 64. The channel identification pattern detection circuit 63 detects the channel identification pattern of its own channel to obtain frame synchronization, and the data demultiplexing circuit 64 demultiplexes the data of its own channel from the multiplexed signal. 1 channel corresponds to 1 demultiplexing circuit.

When the multiplexed signal is obtained by the 3 multiplexing, the detection circuit 61 detects the frame synchronizing patterns A1 and A2 of one of the channels #1 through #3 within the multiplexed signal. That is, A2 which is 3 bytes after A1 is detected. When the frame synchronizing patterns A1 and A2 are detected, the detection circuit 61 supplies the frame synchronizing pattern detection signal to the timing generation circuit 62.

The timing generation circuit 62 supplies timing signals to the channel identification pattern detection circuits 63 of each of the demultiplexing circuits 51 through 5n (in the case of 3 multiplexing, n =3).

The channel identification pattern detection circuits 63 detect and identifies the channel identification pattern C1 from the multiplexed signal with the same timing. When the channel identification pattern C1 of its own channel is detected and identified, this timing is used as a reference to demultiplex the data from the multiplexed signal in the data demultiplexing circuit 64 for every 3 bytes. In addition, when the channel identification pattern C1 of its own channel cannot be detected, the identifying timing is shifted until the channel identification pattern C1 of its own channel can be detected.

Accordingly, the frame synchronization is detected by detecting the frame synchronizing patterns A1 and A2 amounting to 1 channel within the multiplexed signal and detecting the channel identification pattern C1 in the demultiplexing circuits 51 through 5n, it is possible to detect the frame synchronization at a high speed even when the multiplexing factor is large.

Figure 9:
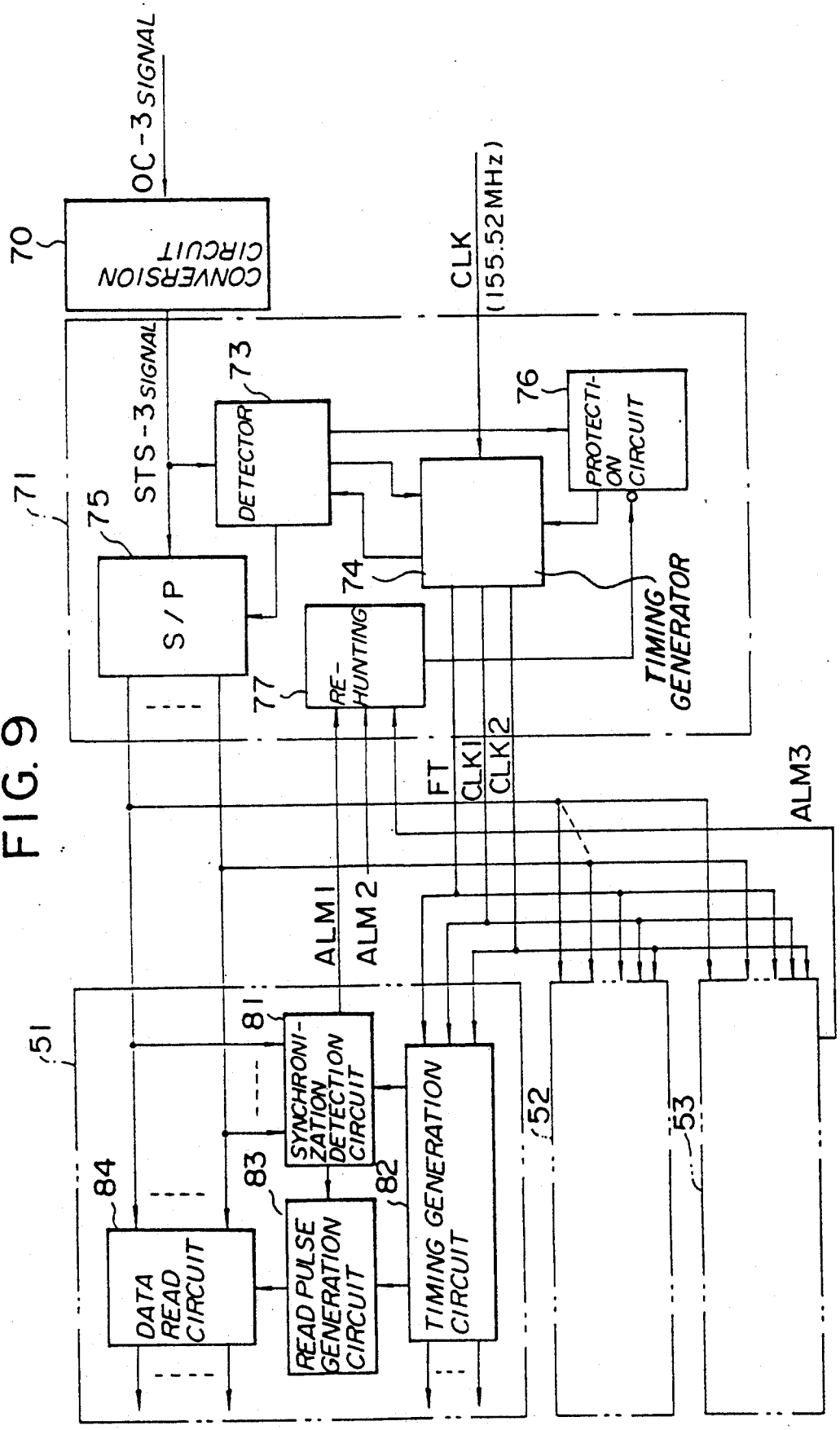
FIG. 9 is a block diagram showing the second embodiment of the present invention in more detail.

FIG. 9 shows the structure of the digital signal demultiplexing apparatus shown in FIG. 8 in detail. The digital signal demultiplexing apparatus has 3 demultiplexing circuits 51 through 53, a conversion circuit 70 and a serial-parallel conversion circuit 71. The first demultiplexing circuit 51 has a synchronization detection circuit 81, a timing generation circuit 82, a data read pulse generation circuit 83, and a data read circuit 84. The second and third demultiplexing circuits 52 and 53 have structures similar to that of the first demultiplexing circuit 51. The serial-parallel conversion circuit 71 has a detector 73, a timing generator 74, a serial-parallel converter 75, a protection circuit 76, and a rehunting circuit 77. The detector 73 corresponds to the detection circuit 61 shown in FIG. 8, and the timing generator 74 corresponds to the timing generation circuit 62 shown in FIG. 8. The data read pulse generation circuit 83 and the data read circuit 84 shown in FIG. 9 correspond to the data demultiplexing circuit 64 shown in FIG. 8, and the synchronization detection circuit 81 corresponds to the channel identification pattern detection circuit 62 shown in FIG. 8.

An OC-3 signal which is an optical signal is received via an optical transmission path (not shown) and is converted into the STS-3 signal which is an electrical signal by the conversion circuit 70. The detector 73 detects the frame synchronizing patterns A1 and A2 amounting to 1 channel within the frame multiplexed synchronizing pattern at the head of the STS-3 signal. A detection signals of the frame synchronizing patterns A1 and A2 is supplied to the timing generator 74. The timing generator 74 responsive to the detection signal starts frequency-dividing a main clock signal CLK of 155.52 MHz, and outputs the frame timing signal FT, the clock signal CLK1 of 51.84 MHz and the clock signal CLK2 of 19.44 MHz.

The STS-3 signal which is obtained by the conversion into the electrical signal in the conversion circuit 70 is converted into 8-bit parallel signals in the serial-parallel converter 75 in synchronism with the frame synchronizing pattern detection signal from the detector 73, and respectively supplied to the first through third demultiplexing circuits 51 through 53. In addition, the protection circuit 76 carries out a forward protection and a backward protection of the synchronous detection by the frame synchronizing pattern detection signal from the detector 73. Further, the when alarm signals ALM1 through ALM3 from the synchronization detection circuits 81 of the first through third demultiplexing circuits 51 through 53 are supplied to the rehunting circuit 77, a rehunting request is output and supplied to the protection circuit 76 so as to reset the protection circuit 76. Hence, the detector 73 successively shifts the detection timing and starts the operation of detecting the frame synchronizing patterns A1 and A2.

The frame timing signal FT and the clock signals CLK1 and CLK2 from the timing generator 74 of the serial-parallel conversion circuit 71 are supplied to the timing generation circuits 82 of the first through third demultiplexing circuits 51 through 53. In addition, the detection timing signal of the channel identification pattern C1 generated in synchronism with the frame timing signal FT is supplied to the synchronization detection circuit 81, and the detection and identification of the channel identification pattern C1 are made. When the channel identification pattern C1 of its own channel is detected and identified, a detection identification signal is supplied to the data read pulse generation circuit 83. Accordingly, a data read signal is supplied to the data read circuit 84, and the data of its own channel is read.

In addition, when the channel identification pattern C1 of its own channel cannot be detected and identified, the detection timing of the channel identification pattern C1 is shifted until the channel identification pattern C1 of its own channel can be detected and identified. Then, when the channel identification pattern C1 of its own channel is detected and identified, the detection identification signal is supplied to the data read pulse generation circuit 83.

Accordingly, in the data read circuits 84 of the demultiplexing circuits 51 through 53, the data of its own channel is read according to the data read signal, and the STS-3 signal is demultiplexed into the STS-1 signals corresponding to the channels.

Figure 10:
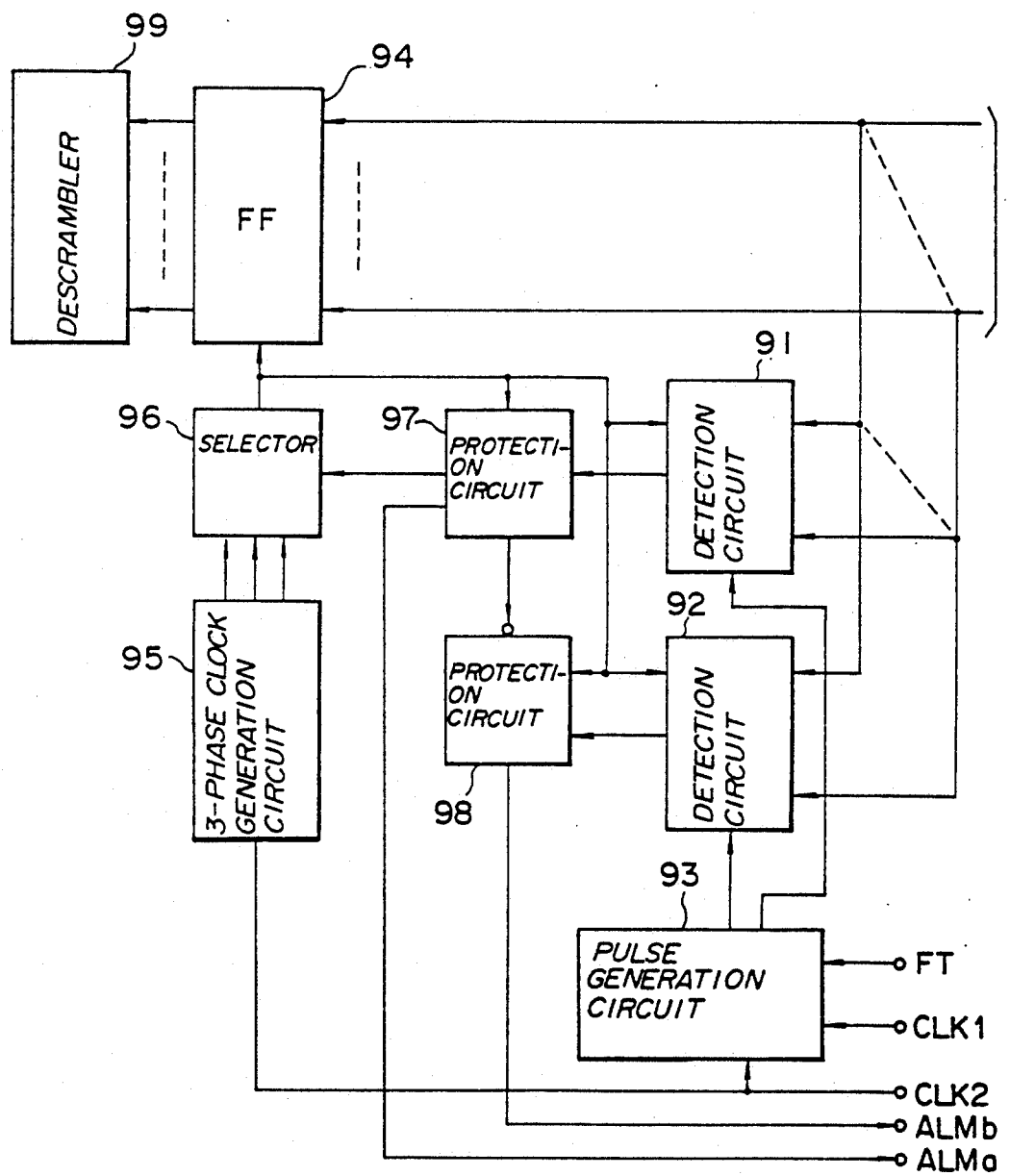
FIG. 10 is a block diagram showing the structure of a demultiplexing circuit shown in FIG. 9.

FIG. 10 is a block diagram showing the first through third demultiplexing circuits 51 through 53 of this embodiment of the present invention. The demultiplexing circuits 51 through 53 of each of the channels respectively have detection circuits 91 and 92, a pulse generation circuit 93, a flip-flop (FF) 94, a 3-phase clock generation circuit 95, a selector 96, protection circuits 97 and 98, and a descrambler 99. The detection circuit 91 detects the channel identification pattern C1. The detection circuit 92 detects the frame synchronizing patterns A1 and A2. The pulse generation circuit 93 outputs detection timing pulses which are applied to the detection circuits 91 and 92 based on the frame timing signal FT and the clock signals CLK1 and CLK2. The flip-flop 94 forms a data read circuit and reads the 8-bit parallel data. The 3-phase clock generation circuit 95 generates clock signals of 3 phases based on the clock signal CLK2. The selector 96 selects one of the 3-phase clock signals and supplies the selected clock signal to the flip-flop 94 as the read pulse.

The frame timing signal FT and the clock signals CLK1 and CLK2 are supplied to the pulse generation circuit 93. The pulse generation circuit 93 supplies a channel identification pattern detection timing signal to the detection circuit 91. In addition, a frame synchronizing pattern detection timing signal is supplied to the detection circuit 92. The detection circuit 91 detects the channel identification pattern C1 according to the timing signal and identifies whether or not it indicates its own channel. When the channel identification pattern C1 of its own channel is detected, a detection signal is supplied to the protection circuit 97. The detection circuit 92 detects the frame synchronizing patterns A1 and A2 according to the timing signal and supplies a detection signal thereof to the protection circuit 98.

When the detection signals are supplied to the protection circuits 97 and 98 a predetermined number of times in succession, alarm signals ALMa and ALMb are respectively set to "1". On the other hand, when the detection signals are not supplied the predetermined number of times in succession, the alarm signals ALMa and ALMb are set to "0" to indicate a synchronization error. For example, the protection circuit 97 has 6 forward protection levels and 2 backward protection levels, and the protection circuit 98 has 7 forward protection levels and 2 backward protection levels.

The 3-phase clock generation circuit 95 outputs the 3-phase clock signal of 19.44 MHz based on the clock signal CLK2 of 19.44 MHz. The selector 96 is controlled by the protection circuit 97 and selects one of the 3-phase clock signals as the read pulse. The read data is descrambled in the descrambler 99.

Figure 11:
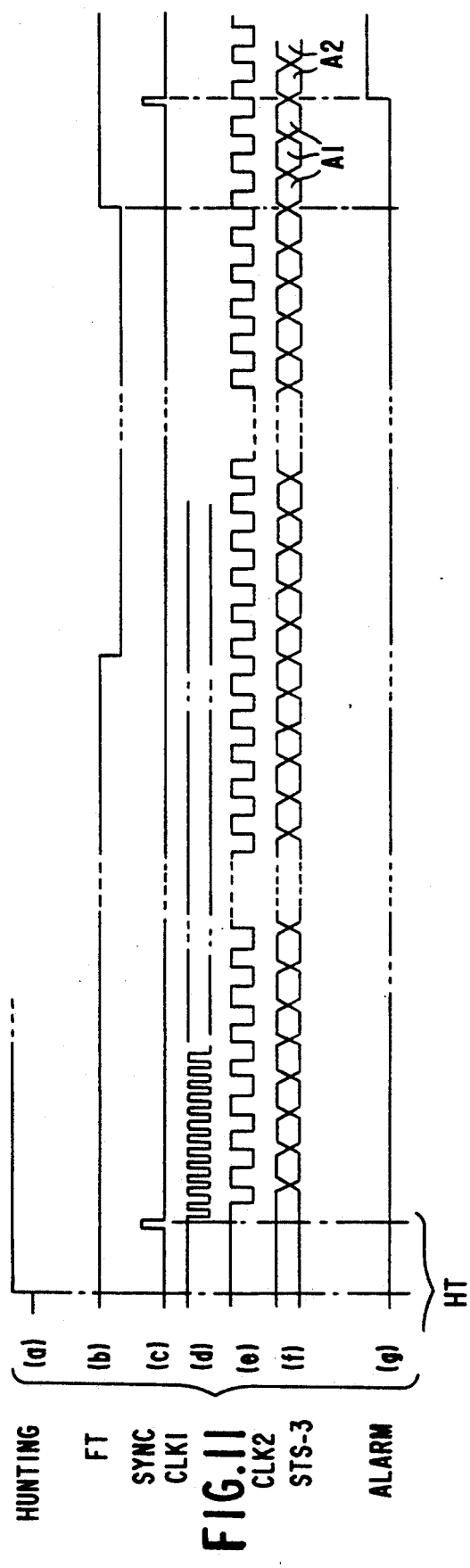
FIG. 11 is a timing diagram showing an operation of a serial-parallel conversion circuit shown in FIG. 9.

FIG. 11 is a diagram for explaining the operation of the serial-parallel conversion circuit 71 of the second embodiment of the invention, where (a) shows the hunting request signal, (b) shows the frame timing signal FT, (c) shows the frame synchronizing pattern detection signal, (d) shows the clock signal CLK1, (e) shows the clock signal CLK2, (f) shows the STS-3 signal which is converted into the parallel signals in the serial-parallel converter 75 and (g) shows the synchronization error alarm signal for 2 backward protection levels.

In an initial state or when the hunting request signal from the rehunting circuit 77 is supplied to the protection circuit 76, the protection circuit 76 is reset. Hence, the detection timing signal which is supplied from the timing generator 74 to the detector 73 is successively shifted, and the frame synchronizing patterns A1 and A2 amounting to 1 channel within the frame multiplexed synchronizing pattern of the STS-3 signal are detected.

When the detection signal of the frame synchronizing patterns A1 and A2 is obtained as shown in FIG. 11(c), the clock signal CLK1 of 51.84 MHz and the clock signal CLK2 of 19.44 MHz which are respectively obtained by frequency-dividing the reference clock signal CLK of 155.52 by 3 and 8 are output from the timing generator 74 as shown in FIG. 11(d) and (e). That is, the output of the clock signals CLK1 and CLK2 is stopped during a hunting period HT.

The byte multiplexed serial STS-3 signal is converted into the 8-bit parallel signals when the detection signal of the frame synchronizing patterns A1 and A2 is supplied from the detector 73 to the serial-parallel converter 75 in synchronism with this supply of the detection signal, and is output as shown in FIG. 11(f). In addition, the frame timing signal FT has a period amounting to one frame of the STS-3 signal which is converted into the parallel signals, and the rising edge is determined by the detection timing of the frame synchronizing patterns A1 and A2 in the detector 73. As shown in FIG. 11(c), when the detection signal is obtained two times in succession, the alarm signal changes from "0" to '1" as shown in FIG. 11(g) because 2 backward protection levels are provided, and the alarm of the frame synchronizing pattern detection is cancelled.

Figure 12:
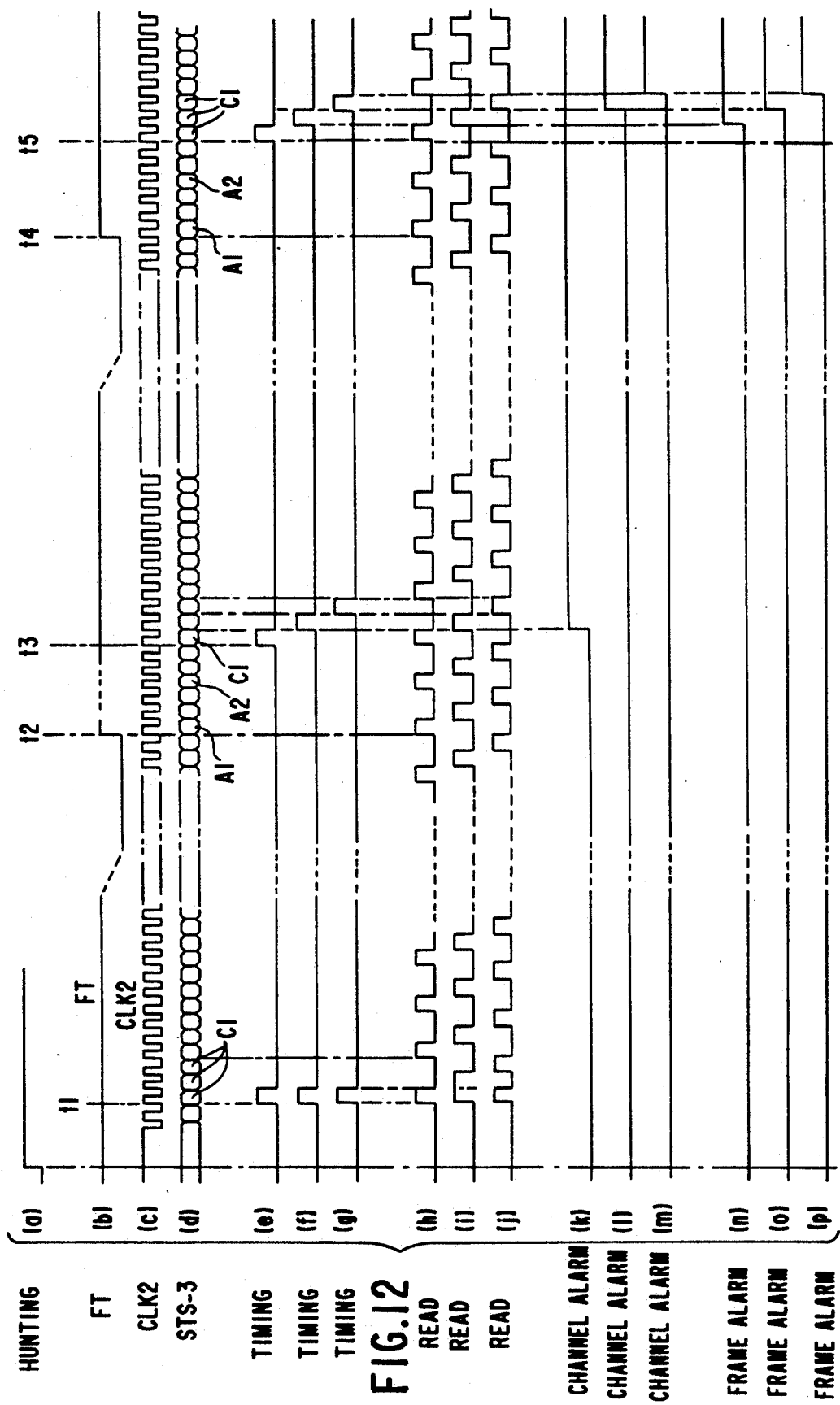
FIG. 12 is a timing diagram showing an operation of a demultiplexing circuit in FIG. 9.

FIG. 12 is a diagram for explaining the operations of the first through third demultiplexing circuits 51 through 53 of the second embodiment of the invention, wherein (a) shows the rehunting signal, (b) shows the frame timing signal FT, (c) shows the clock signal CLK2 of 19.44 MHz, (d) shows the STS-3 signal which is converted into 8-bit parallel signals, (e) through (g) show timing signals which are supplied from the timing generation circuits 82 of the first through third demultiplexing circuits 51 through 53 to the synchronization detection circuits 81, (h) through (j) show read signals which are supplied from the data read pulse generation circuits 83 of the first through third demultiplexing circuits 51 through 53 to the data read circuits 84, (k) through (m) show alarm signals for the detection of the channel identification pattern C1, and (n) through (p) show alarm signals for the detection of the frame synchronizing patterns A1 and A2. When the rehunting signal becomes "1" as shown in FIG. 12(a) and the frame synchronizing patterns A1 and A2 are detected thereafter in the serial-parallel conversion circuit 71, the timing generator 74 supplies the frame timing signal FT and the clock signals CLK1 and CLK2 to each of the demultiplexing circuits 51 through 53. In addition, the STS-3 signal is converted into the 8-bit parallel signals and supplied from the serial-parallel converter 75 to each of the demultiplexing circuits 51 through 53.

In the demultiplexing circuits 51 through 53, the timing generation circuits 82 supply the timing signals of identical timings shown in FIG. 12(e) through (f) to the synchronization detection circuits 81 at a time t1. Hence, the same channel identification pattern C1 is detected, and a determination is made on whether or not the channel identification pattern C1 corresponds to its own channel.

For example, when the channel identification pattern C1 of its own channel is detected in the synchronization detection circuit 81 of the first demultiplexing circuit 51 of channel #1, the channel identification pattern C1 of their own channels cannot be detected in the second and third demultiplexing circuits 52 and 53 of channels #2 and #3. Hence, the synchronization detection circuit 81 of the second demultiplexing circuit 52 shifts the detection timing of the channel identification pattern C1 by 1 byte, and the synchronization detection circuit 81 of the third demultiplexing circuit 53 shifts the detection timing of the channel identification pattern C1 by 2 bytes. The shift can be controlled with ease by determining which channel is indicated by the channel identification pattern C1. That is, in FIG. 10, the selector 96 is controlled via the protection circuit 97 depending on the detection result of the channel identification pattern C1 in the detection circuit 91, and a control is carried out to select and supply one of the 3-phase clock signals to the flip-flop 94.

The frame timing signal FT becomes "1" at a next time t2. When the head of the frame multiplexed synchronizing pattern is obtained at this time, it is possible to detect the channel identification pattern C1 of channel #1 by the detection timing signal of the channel identification pattern C1 at a time t3. Accordingly, in the first demultiplexing circuit 51, the channel identification pattern C1 of its own channel is detected two times in succession, and the alarm signal is set to "1" as shown in FIG. 12(k) to alarm. That is, in FIG. 10, the alarm signal ALMa from the protection circuit 97 becomes "1", and it is possible to indicate that the channel identification pattern C1 of its own channel is detected. In addition, because the detection timing signals in the second and third demultiplexing circuits 52 and 53 are respectively shifted by 1 byte and 2 bytes from the detection timing signal in the first demultiplexing circuit 51 as shown in FIG. 12(f) and (g), it is possible to detect the channel identification patterns C1 of their own channels in the second and third demultiplexing circuits 52 and 53.

The head of the frame multiplexed synchronizing pattern is obtained at a next time t4. The channel identification patterns C1 of their own channels can be detected in the first through third demultiplexing circuits 51 through 53 by the detection timing signals at a time t5 and after, and since the detection takes place two times in succession, the alarm signals are set to "1" to cancel the alarm.

In addition, when the detection circuit 92 for detecting the frame synchronizing patterns A1 and A1 and levels are provided in each of the first through third demultiplexing circuits 51 through 53 as shown in FIG. 10, the alarm signals ALMb from the protection circuits 98 change from "0" to "1" as shown in FIG. 12(n) through (p) when the alarm signals ALMa (alarm signals shown in FIG. 12(k) through (m)) of identification pattern detection become "1" and the frame synchronizing patterns A1 and A2 are detected two times in succession, and the alarm is cancelled, that is, the synchronization is achieved.

Figure 13:
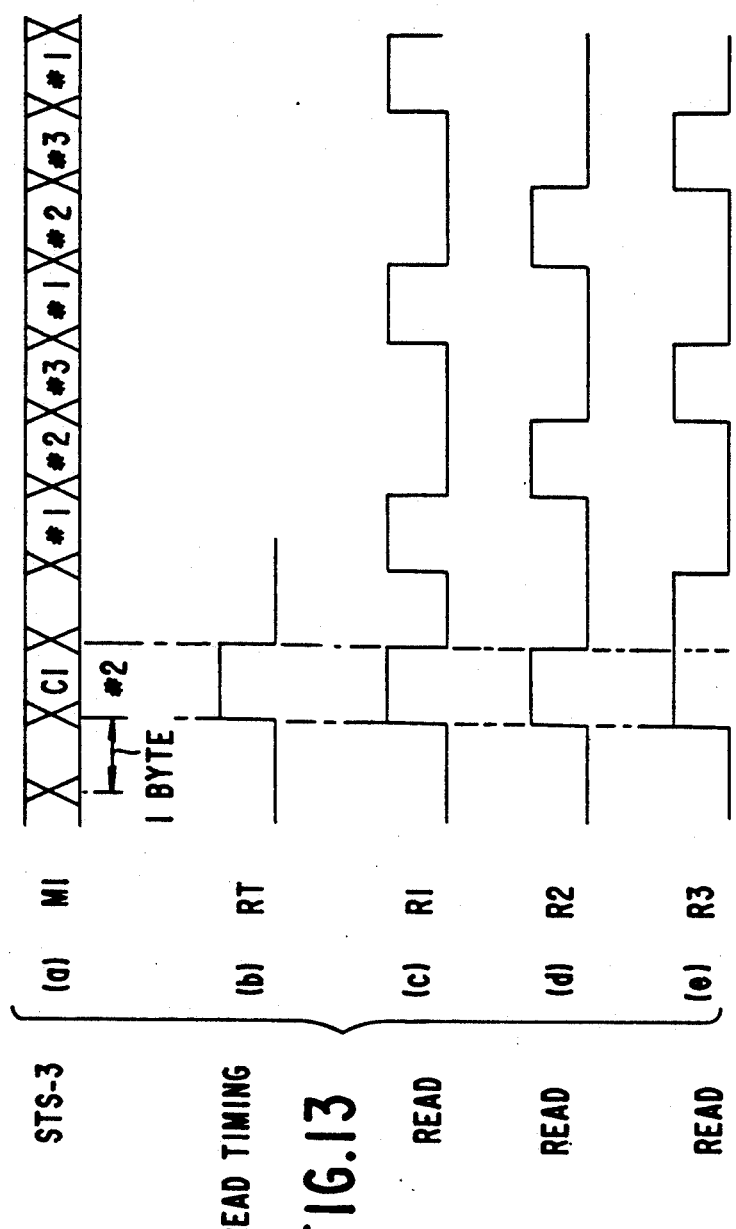
FIGS. 13 through 17 are timing diagrams showing an operation of the second embodiment of the present invention.

FIG. 13 is a diagram for explaining the operation of the second embodiment of the present invention. M1 denotes the STS-3 signal, RT denotes the read timing signal, and R1, R2 and R3 show examples of the read signals in the first through third demultiplexing circuits 51 through 53. FIG. 13 shows the operation at the initial stage of the detection and identification of the channel identification pattern C1, that is, the operation in a vicinity of the time t1 shown in FIG. 12. The timing generator 74 starts operation as described above by detecting in the detector 73 of the serial-parallel conversion circuit 71 the frame synchronizing patterns A1 and A2 of 1 arbitrary channel within the frame multiplexed synchronizing pattern. Hence, the channel identification patterns C1 are detected with the same timing as indicated by RT in each of the first through third demultiplexing circuits 51 through 53.

In this case, in the case of the timing of the channel identification pattern C1 of channel #2, the phase of the read signal of channel #1 is advanced 1 byte and the phase of the read signal of channel #3 is delayed 1 byte as indicated by R1 through R3. Such a control is carried out in FIG. 10 by controlling the selector 96 by the protection circuit 97 and selecting one of the 3-phase clock signals from the 3-phase clock generation circuit 95.

Figure 14:
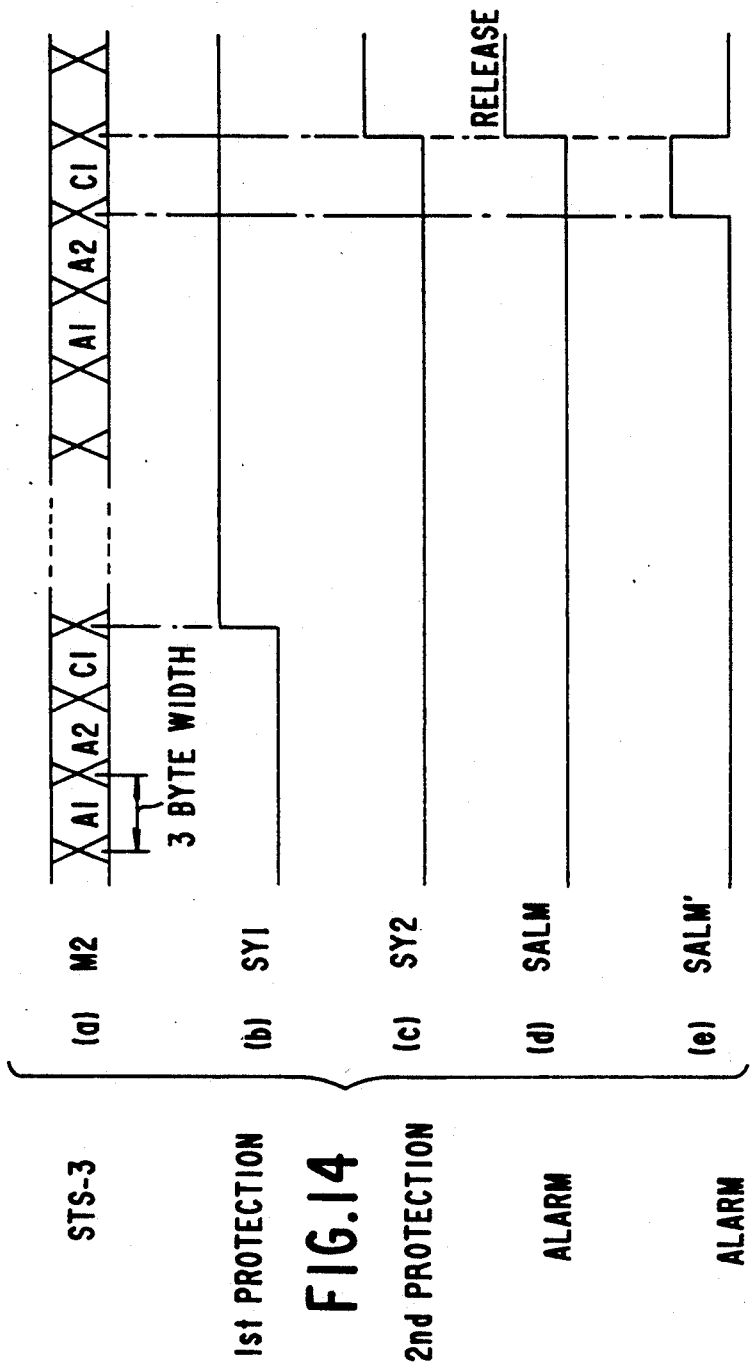

In the case where the protection circuits 97 and 98 shown in FIG. 10 have two backward protection levels, an output SY1 of the first protection level becomes "1" by the detection and identification of the frame synchronizing patterns A1 and A2 and the channel identification pattern C1 of the STS-3 signal M2 which is simplified and shown in FIG. 14, and an output SY2 of the second protection level becomes "1" by the detection and identification of the frame synchronizing patterns A1 and A2 and the channel identification pattern C1 of the next frame. Accordingly, a synchronizing protection alarm signal SALM becomes "1".

As described above, when the detection of the frame synchronizing patterns A1 and A2 by the protection circuit 98 is fixed under the condition that the detection and identification of the channel identification pattern C1 by the protection circuit 97 are fixed, the synchronizing protection alarm signal SALM becomes "1". It is assumed that the synchronization is not fixed until the detection and identification of the channel identification pattern C1 is fixed. When the channel identification pattern C1 of its own channel cannot be detected and identified, the protection circuit 97 resets the protection circuit 98. On the contrary, when it is assumed that the frame synchronizing patterns A1 and A2 are detected, the synchronizing protection alarm signal which once becomes "1" immediately changes to "0" as indicated by SALM' when the channel identification pattern C1 of its own channel cannot be detected after detection of the frame synchronizing patterns A1 and A2. When this occurs repeatedly, there is a possibility that the alarm signal becomes disordered. However, by the above described control, it is possible to carry out a stable synchronizing protection.

Figure 15:
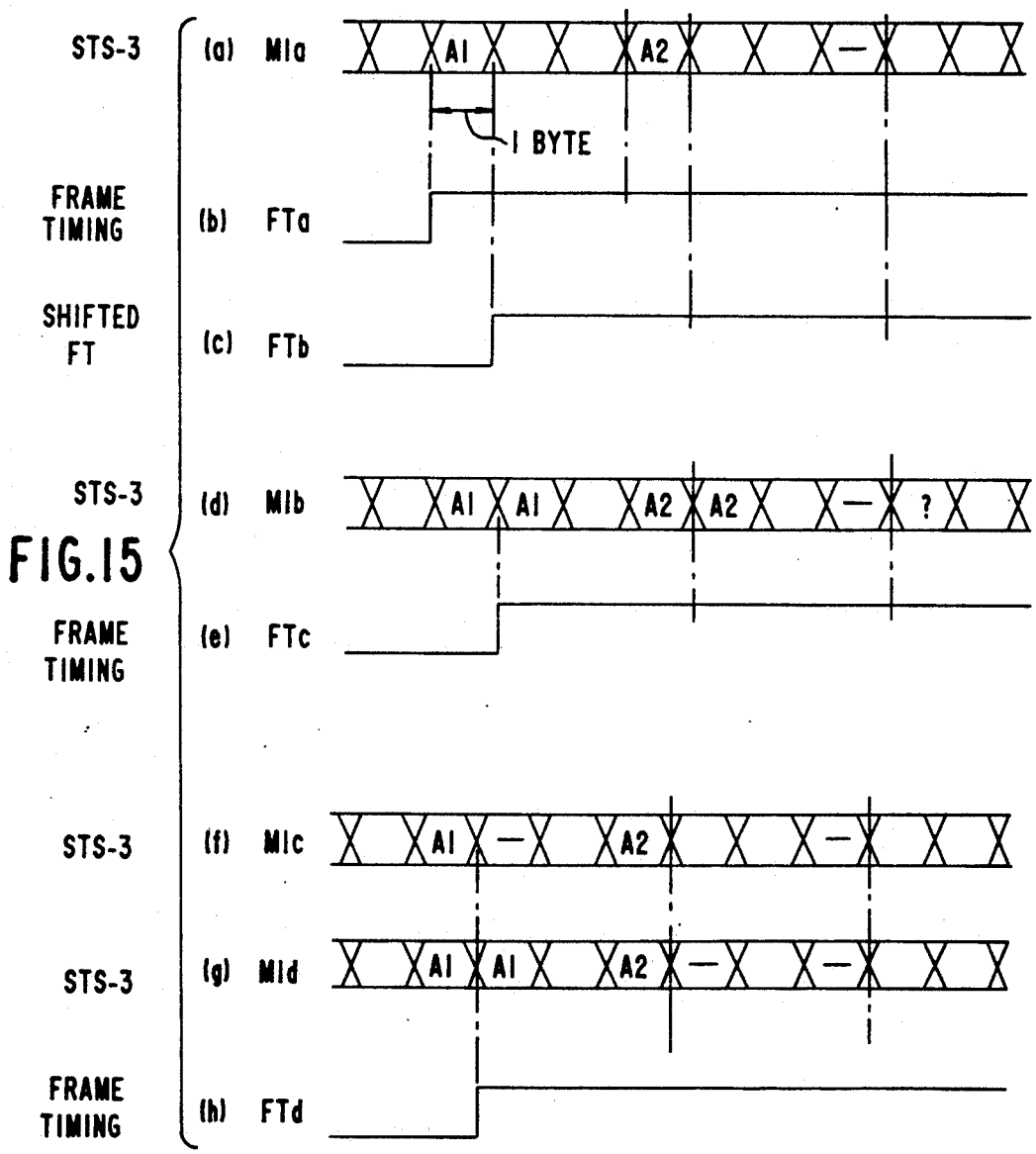

In the case where the frame timing is FTa with respect to the STS-3 signal indicated by M1a in FIG. 15, the frame timing is shifted 1 byte as indicated by FTb when the channel identification pattern C1 cannot be detected to 2 successive frames. Hence, the relationship becomes as indicated by M1b and FTc, and the synchronization is fixed when the channel identification pattern C1 exists at a position indicated by "?". When the channel identification pattern C1 does not exist at the position indicated by "?", the frame timing is shifted after protecting 2 frames.

There are cases where the frame synchronizing patterns A1 and A2 cannot be detected by the shifting of the frame timing. In other words, when the STS-3 signal is as indicated by M1c with respect to the frame timing indicated by FTd, the frame synchronizing pattern A1 cannot be detected. In addition, when the STS-3 signal is as indicated by M1d, the frame synchronizing pattern A2 cannot be detected. In such cases, a rehunting is made.

Figure 16:
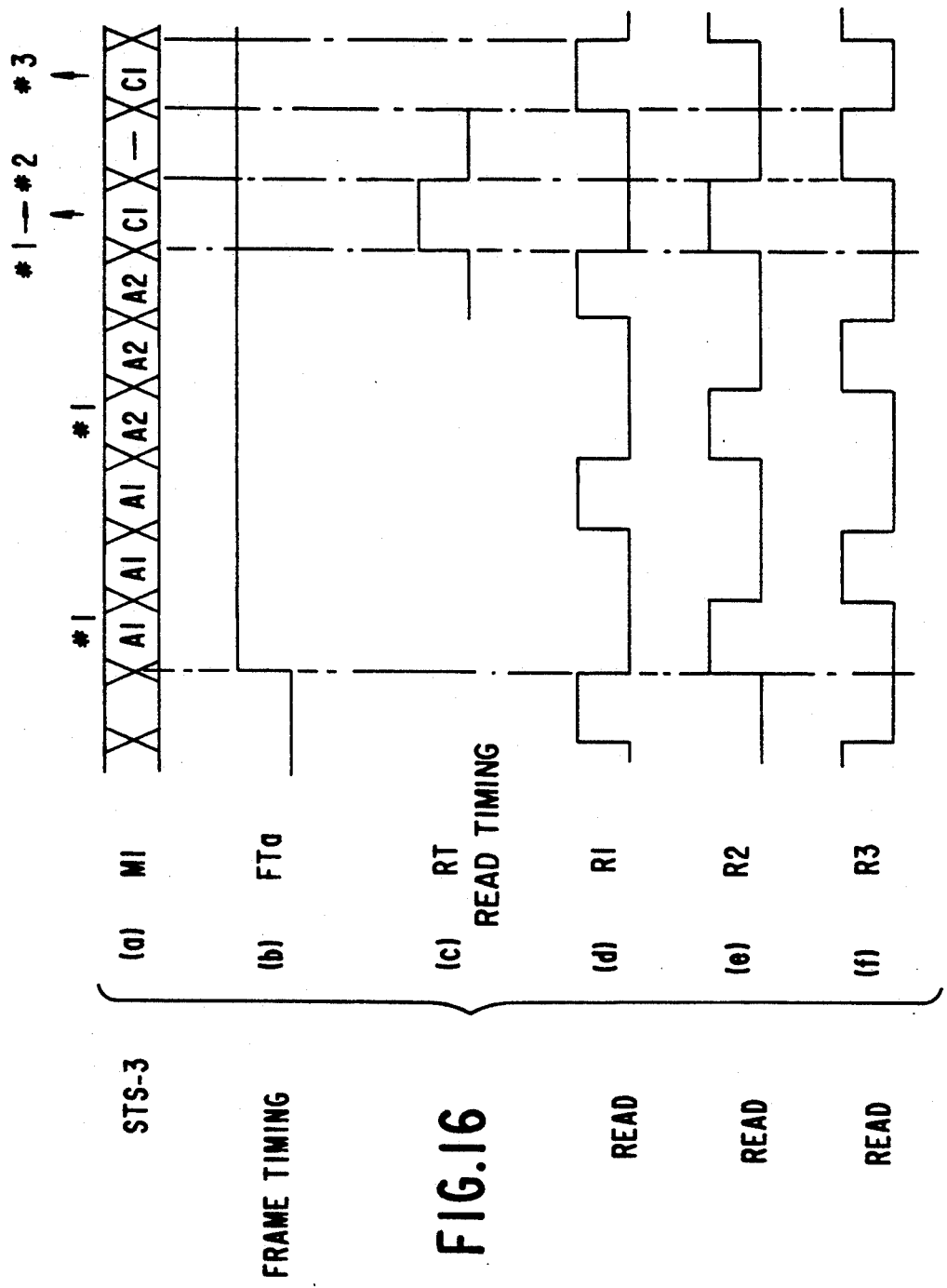

In addition, an error which is included may be such that the channel identification pattern of a certain channel indicates another channel. For example, when the frame timing is FTa with respect to the STS-3 signal indicated by M1a in FIG. 16, the channel identification pattern C1 of channel #1 changes to that of channel #2. In the case of the read timing indicated by RT, the demultiplexing circuits 51 through 53 of channels #1 through #3 detect the channel identification pattern C1 at the position of the channel #1 with the same timing.

In this state, in the second demultiplexing circuit 52 of channel #2, the synchronization can be fixed because the channel identification pattern indicating its own channel can be detected. But on the other hand, in the first demultiplexing circuit 51 of channel #1 which identifies the channel identification pattern of channel #2, the phase of the read signal R1 is advances 1 byte with respect to the read signal R2, and in the third demultiplexing circuit 53 of channel #3, the phase of the read signal R3 is delayed 1 byte with respect to the read signal R2, and thus, the synchronization cannot be fixed for these channels #2 and #3.

However, when the channel identification pattern C1 returns to normal, the second demultiplexing circuit 52 of channel #2 no longer detects the channel identification pattern of its own channel, and the state returns to normal by carrying out the rehunting.

Figure 17:
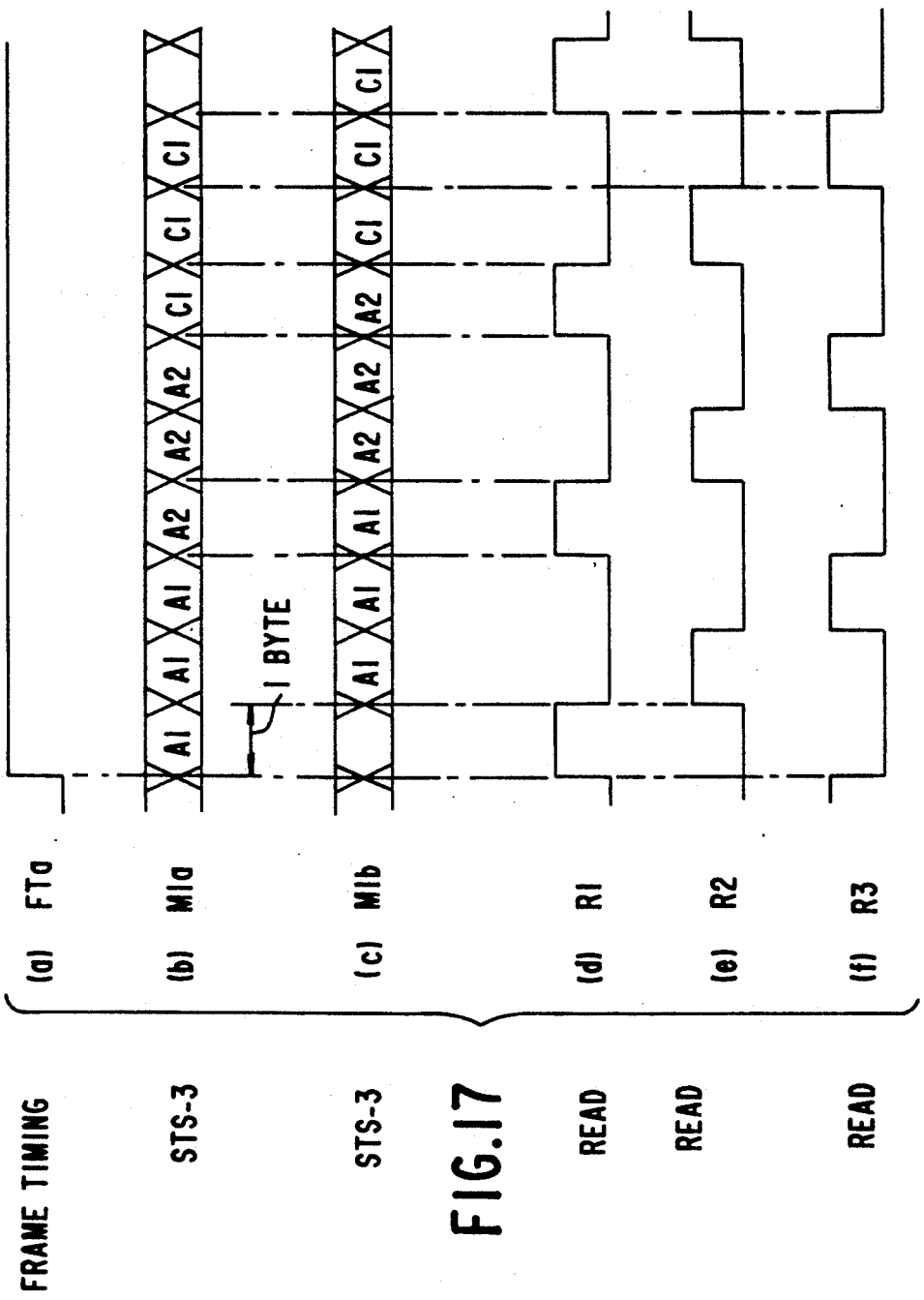

In addition, when the STS-3 signal suddenly shifts 1 byte as indicated by M1b and the STS-3 signal and the read signals of the demultiplexing circuits respectively have the timings indicated by M1a and R1 through R3 in FIG. 17, for example, the first through third demultiplexing circuits 51 through 53 cannot detect and identify the channel identification patterns C1 of their own channels. Hence, the rehunting is carried out after a predetermined number of frames corresponding to the number of forward protection levels, and the frame timing indicated by FTa is also shifted 1 byte so as to return to the original state.

As described above, the frame synchronization is achieved by detecting the frame synchronizing patterns A1 and A2 of amounting to 1 channel within the frame multiplexed synchronizing pattern, and the synchronization is achieved in each channel by the detection and identification of the channel identification pattern C1. As a result, the frame synchronization is achieved with respect to the multiplexed signal and it is possible to carry out the multiplexing and demultiplexing.

The present invention is not limited to the second embodiment described above, and the multiplexing factor or the like may be made even larger. Even in such cases, the synchronization can be achieved at a high speed because it is simply necessary to detect the frame synchronizing patterns A1 and A2 amounting to 1 channel.

According to the above described structure, there is an advantage in that the scale of the synchronization detection means can be reduced compared to the case where the entire frame multiplexed synchronizing pattern is detected. In addition, the time required to achieve the synchronization can be reduced because the number of processing bytes is small. In addition, even when a drop out occurs in the data of a certain channel due to a line error or the like, there is an advantage in that the the multiplexing and demultiplexing can be carried out in frame synchronism based on the data of the normal channel.

As described above, the first embodiment scrambles the data upon transmission except for the frame synchronizing patterns A1 and A2 and the channel identification pattern C1. In addition, the frame synchronization is achieved on the receiver end by detecting the frame synchronizing patterns A1 and A2, and a predetermined byte identification is made after carrying out a descrambling.

In the STS-1 signal described above, the probability that the frame synchronizing patterns A1 and A2 do not match can be described by $1-(1-P)^r$, where P denotes the line error rate and r denotes the number of bits of the frame synchronizing patterns A1 and A2. When the number of forward protection levels is denoted by N1, the significance level of missing frame can be described by $(1-(1-P)^r)^{N1}$. Accordingly, when the line error rate P is $10^{-3}$, the significance level of missing frame and the minimum synchronous error time for the N1 forward protection levels become as shown in the following Table 1.

TABLE 1

| Number of Protection Levels | Significance Level of Missing Frame (times/year) | Minimum Synchronous Error Time (μs) |
|---|---|---|
| 4 | 15876 (1.8 times/hour) | 375 |
| 5 | 252 (6.9 times/day) | 500 |
| 6 | 4 | 625 |
| 7 | 0.06 (6.4 times/100 years) | 750 |

Accordingly, it is sufficient to set the number of forward protection levels to 6.

In addition, when the number of backward protection levels is denoted by N2, the probability that non-matching frame synchronizing patterns are not detected becomes $1-0.5^{rN2}$. Hence, the probability that the non-matching occurs for all bits (1 frame = 6480 bits) within the detection period becomes $(1-0.5^{rN2})6480-1$ Accordingly, the probability of erroneous synchronization becomes $1-(1-0.5^{rN2})6480-1$. In addition, the rehunting rate becomes $1-(1-P)^{rN2}$. When the line error rate P is $10^{-3}$ as described above, the probability of erraneous synchronization and the rehunting rate for the N2 backward protection levels become as shown in the following Table 2.

TABLE 2

| Number of Protection Levels | Probability of Erroneous Synchronization (%) | Rehunting Rate (%) |
|---|---|---|
| 1 | 9.4 | 1.6 |
| 2 | $1.5 \times 10^{-4}$ | 3.2 |
| 3 | — | 4.7 |

Accordingly, the rehunting rate becomes approximately the same as the valve shown in Table 2 even when the line error rate P is $10^{-6}$.

When the number of backward protection levels is 2 for the frame synchronization of the STS-1 signal described above, the probability of erroneous synchronization becomes $1.5 \times 10^{-4}$, and it may be regarded from the practical point of view that the probability of pseudo synchronization is zero. This is because the 16-bit frame synchronizing patterns A1 and A2 exist for the frame length of 6480 bits.

However, it is assumed that the data byte and the overhead byte have random patterns for every frame, and the probability of pseudo synchronization increases when a fixed pattern exists. In other words, the STS-1 signal is subjected to the reset type 7-stage scrambling and the reset takes place at a predetermined position of the frame. Hence, the scrambling pattern becomes constant when attention is drawn to a certain byte within the frame. For this reason, when 2 successive bytes of the data communication bytes D1 through D12 have a fixed pattern, for example, and become identical to the frame synchronizing patterns A1 and A2 by the scrambling, there is a problem in that the probability that the pseudo synchronous state, that is, the probability of erroneous synchronization, increases.

It is an object of a third embodiment of the present invention to prevent the pseudo synchronization by a simple structure.

In the third embodiment, the channel identification pattern is used to identify whether or not the pseudo synchronization is made. When it is determined that the pseudo synchronization is made, a rehunting is carried out. A description will now be given of the third embodiment with reference to FIG. 18.

A frame synchronizing pattern detection circuit 101 receives the STS-1 signal having the frame structure in which two bytes of frame synchronizing patterns A1 and A2 and 1 byte of channel identification pattern C1 are added to the head, and detects the frame synchronizing patterns A1 and A2. A synchronization protection circuit 102 receives a detection signal from the frame synchronizing pattern detection circuit 101. A channel identification pattern detection circuit 103 detects and identifies the channel identification pattern C1 within the STS-1 signal. Even when the frame synchronizing pattern detection circuit 101 detects the frame synchronizing patterns but the channel identification pattern detection circuit 103 cannot correctly detect the channel identification pattern, the synchronization protection circuit 102 is reset so as to make a rehunting in the frame synchronizing pattern detection circuit 101.

When fixed patterns exist in the overhead byte and become the same as the scrambled frame synchronizing patterns A1 and A2, the frame synchronizing pattern detection circuit 101 detects these fixed patterns as the frame synchronizing patterns A1 and A2, and the synchronization protection circuit 102 outputs a synchronization detection signal by determining that the synchronization is fixed from the number of successive detections corresponding to the number of forward protection levels.

However, when such a pseudo synchronization is obtained, the channel identification pattern detection circuit 103 cannot detect the channel identification pattern C1. When the channel identification pattern C1 cannot be detected, it is determined that the pseudo synchronization is obtained, and the synchronization protection circuit 102 is reset so that the frame synchronization pattern detection circuit 101 makes the rehunting. Hence, it becomes possible to positively prevent the pseudo synchronization because the channel identification pattern C1 can be detected when the correct frame synchronizing patterns A1 and A2 are detected.

Figure 18:
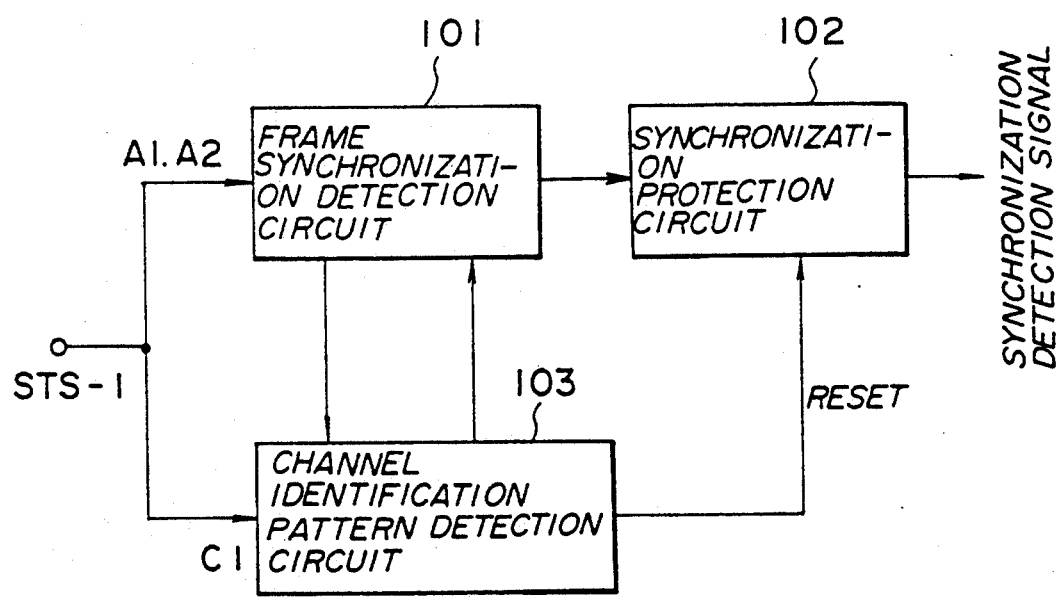
FIG. 18 is a diagram showing the structure in principle of a third embodiment of the present invention.

The structure of FIG. 18 is used in place of the detection circuits 91 and 92 and the protection circuit 97 shown in FIG. 10.

Figure 19:
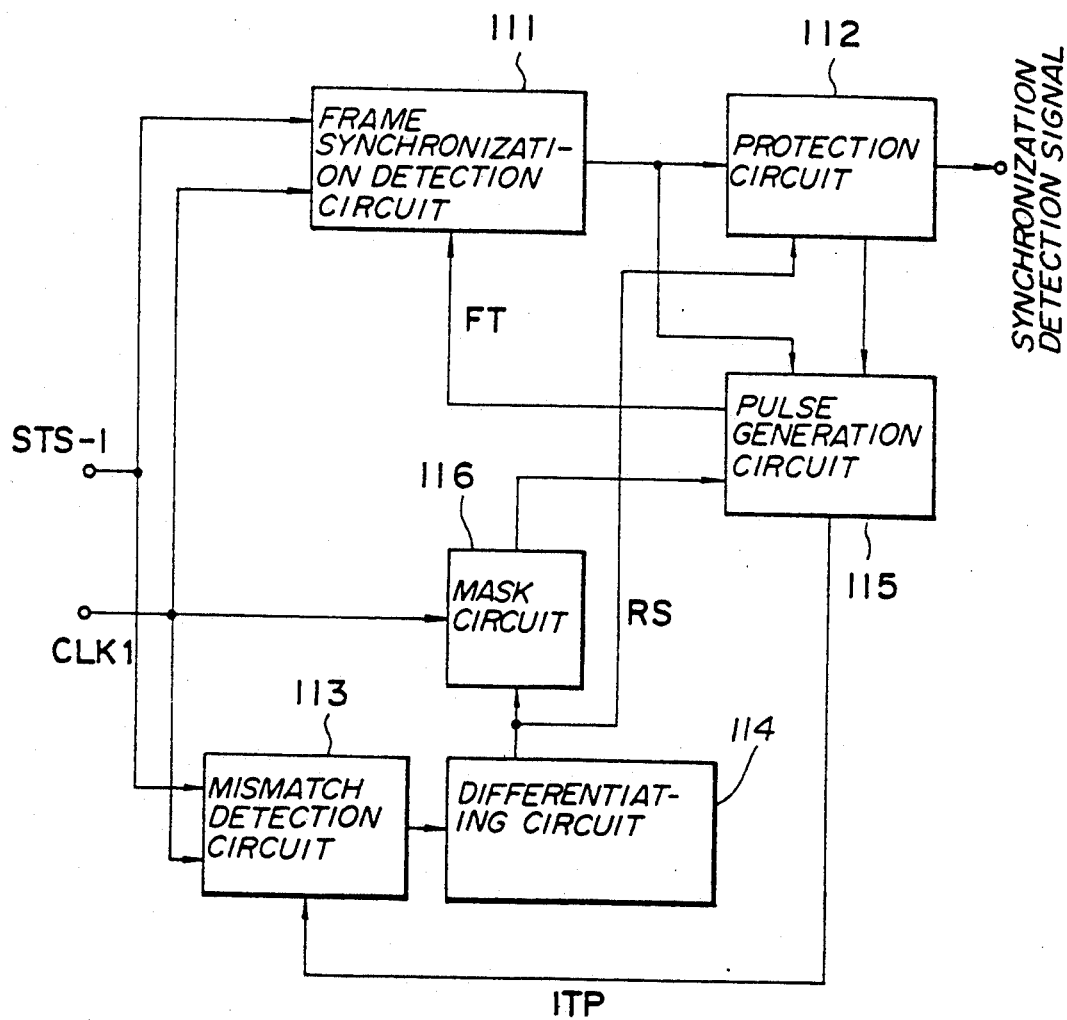
FIG. 19 is a block diagram showing the structure shown in FIG. 18 in more detail.

FIG. 19 is a block diagram showing the structure of FIG. 18 in detail. The structure shown includes a frame synchronizing pattern detection circuit 111, a protection circuit 112, a miss-match detection circuit 113, a differentiating circuit 114, a pulse generation circuit 115 and a masking circuit 116. The frame synchronizing pattern detection circuit 101, the synchronization protection circuit 102 and the channel identification pattern detection circuit 103 shown in FIG. 18 respectively correspond to the frame synchronizing pattern detection circuit 111, the protection circuit 112 and the miss-match detection circuit 113.

The STS-1 signal and the clock signal CLK1 are supplied to the frame synchronizing pattern detection circuit 111 and the miss-match detection circuit 113. This clock signal CLK1 has a frequency of 51.84 MHz which is the bit rate of the STS-1 signal. In addition, the clock signal CLK1 is supplied to the pulse generation circuit 115 via the masking circuit 116. The pulse generation circuit 115 counts the clock signal CLK1 corresponding to a number of bits amounting to 1 frame and supplies the frame timing pulse FT to the frame synchronizing pattern detection circuit 111. When making the rehunting, the frame timing pulse FT is shifted if no frame synchronization pattern detection signal is obtained from the frame synchronizing pattern detection circuit 111. When a signal indicating the fixing of the synchronization is obtained from the protection circuit 112, the frame timing pulse FT is output with the above described timing. In addition, an identification timing pulse ITP is supplied to the miss-match detection circuit 113.

For example, the protection circuit 112 has 2 backward protection levels and 6 forward protection levels. When the detection signal is received from the frame synchronizing pattern detection circuit 111 and the detection signal is received successively for a number of times greater than or equal to the number of backward protection levels, the synchronization detection signal is output to indicate that the synchronization is fixed. On the other hand, when the detection signal is not received successively for a number of times greater than or equal to the number of forward protection levels, no synchronization detection signal is output to indicate the synchronization error. A miss-match detection signal of the channel identification pattern C1 from the miss-match detection circuit 113 is differentiated in the differentiating circuit 114 and this signal is used as a reset signal RS for resetting.

The signal which is differentiated in the differentiating circuit 114 is supplied to the masking circuit 116. The masking circuit 116 masks the clock signal CLK1 from the pulse generation circuit 115 by 1 pulse, and the frame synchronizing pattern detection circuit 111 starts the hunting.

In the frame synchronizing pattern detection circuit 111, the frame synchronizing pattern is detected with the timing of the frame timing pulse FT. When the pseudo synchronization state is reached, the miss-match detection circuit 113 compares the channel identification pattern C1 with the timing of the identification timing pulse ITP as described above and it is found that the correct frame synchronizing patterns A1 and A2 are not detected. Thus, the miss-match detection signal is differentiated in the differentiating circuit 114 and becomes the reset signal RS for the protection circuit 112 as described above to reset the protection circuit 112 to the initial state. In addition, because the masking circuit 116 masks the clock signal CLK1 which is supplied to the pulse generation circuit 115 by 1 pulse, the rehunting state is reached forcibly. Accordingly, it is possible to prevent the pseudo synchronization.

INDUSTRIAL APPLICABILITY

The present invention may be applied to high-speed transmission networks such as the SONET.

We claim:

1. A digital signal multiplexing apparatus comprising:
    n, where n is an arbitrary integer, multiplexing means for converting input signals from a plurality of lines into m, where m is an arbitrary integer, parallel signals to which additional bits are added and have a first transmission speed;
    parallel-serial conversion means for converting the m parallel signals from said n multiplexing means into a serial multiplexed signal by a parallel-serial conversion which uses a clock signal having a bit rate equal to m times a second transmitting speed which is equal to n times the first transmission speed; and a bus for connecting the n multiplexing means and the parallel-serial conversion means, the n multiplexing means respectively having means for successively transmitting the m parallel signals to the bus in synchronism with a pulse signal having said second transmission speed.

2. The digital signal multiplexing apparatus as claimed in claim 1, wherein the n multiplexing means respectively comprise:

pulse generation means for generating a control pulse for arranging the m parallel signals in one n sections corresponding to the second transmission speed; and control means, coupled to said pulse generating means, for receiving the control pulse from said pulse generation means and for arranging the m parallel signals in said one of the n sections which is specified by the control pulse among the n sections.

3. The digital signal multiplexing apparatus as claimed in claim 2, wherein the n multiplexing means respectively comprise scrambling means for combining the m parallel signals and a pseudo random pattern together using said control pulse, and the scrambled m parallel signals are transmitted on the bus.

4. The digital signal multiplexing apparatus as claimed in claim 2, wherein the control means comprise n elements having a high impedance state and a low impedance state, and the high impedance state and the low impedance state are controlled by the control pulse from the pulse generation means.

5. The digital signal multiplexing apparatus as claimed in claim 1, wherein the parallel-serial conversion means comprise pulse generation means for generating a pulse signal which defines the second transmission speed, and said pulse signal is transmitted to the n multiplexing means.

6. The digital signal multiplexing apparatus as claimed in claim 1, wherein the n multiplexing means comprise input means for generating the m parallel signals by multiplexing a plurality of external signals.

7. The digital signal multiplexing apparatus as claimed in claim 1, wherein the bus is an m-bit bus.

8. The digital signal multiplexing apparatus as claimed in claim 1, wherein the m parallel signals respectively have data in units of bytes, and the multiplexing means converts the m parallel signals having the first transmission speed into signals having the second transmission speed in bytes.

9. The digital signal multiplexing apparatus as claimed in claim 1, wherein the n multiplexing means are formed by CMOS logic circuits, and the parallel-serial conversion means is formed by an ECL logic circuit.

10. A digital signal demultiplexing apparatus comprising:

serial-parallel conversion means for converting a serial input signal into m, where m is an arbitrary integer, parallel signals having a predetermined transmission speed by a serial-parallel conversion which uses a clock signal having a speed equal to m times said predetermined transmission speed;

n, where n is an arbitrary integer, demultiplexing means for demultiplexing added bits from the m parallel signals from said serial-parallel conversion means and for outputting the added bits on a plurality of lines with the predetermined transmission speed; and a bus for connecting the serial-parallel conversion means and the n demultiplexing means, the n demultiplexing means respectively having means for receiving the m parallel signals output on the bus from the serial-parallel conversion means with a clock timing of a speed identical to the predetermined transmission speed.

11. A digital signal demultiplexing apparatus which demultiplexes a serial multiplexed signal having a header, said header having a frame multiplexed synchronizing pattern in which a 2-byte frame synchronizing pattern and a 1-byte demultiplexing circuit identification pattern, which are defined for each of n demultiplexing circuits which are provided in said digital signal demultiplexing apparatus, where n is an arbitrary integer, are byte-multiplexed, and comprising:

detection means for outputting a detection signal when detecting from the multiplexed signal the frame synchronizing pattern corresponding to one demultiplexing circuit; and timing generation means for generating a timing signal in response to the detection signal from said detection means, the n demultiplexing circuits respectively having demultiplexing circuit identification pattern detection means for detecting the demultiplexing circuit identification pattern from the multiplexed signal in response to the timing signal from the timing generation means, and n demultiplexing means for demultiplexing data respectively related to the n demultiplexing circuits from the multiplexed signal by referring to said demultiplexing circuit identification pattern which is detected.

12. The digital signal demultiplexing apparatus as claimed in claim 11, wherein the demultiplexing circuit identification pattern detection means of each demultiplexing circuit comprises:

determining means for determining whether or not the detected demultiplexing circuit identification pattern corresponds to said demultiplexing circuit in response to the timing signal from the timing generation means; and shift means for shifting a timing with which the demultiplexing circuit identification pattern detection means detects the demultiplexing circuit identification pattern so that said demultiplexing circuit identification pattern detection means definitely detects the demultiplexing circuit identification pattern when said determining means determines that the detected demultiplexing circuit identification pattern does not correspond to said demultiplexing circuit.

13. The digital signal demultiplexing apparatus as claimed in claim 12, wherein the shift means comprise clock generation means for generating a plurality of clock signals having mutually different phases and selection means for selecting one of the plurality of clock signals in according with a determination result of the determining means, and the demultiplexing means of each demultiplexing circuit demultiplexes from the multiplexed signal data related to said demultiplexing means in synchronism with one of the clock signals selected by the selection means.

14. The digital signal demultiplexing apparatus as claimed in claim 12, wherein the determining means comprise protection means for shifting a frame synchronizing pattern detecting timing of the detection means when it is determined that the demultiplexing circuit identification pattern related to said demultiplexing circuit is not detected with a predetermined number of successively multiplexed signals.

15. The digital signal demultiplexing apparatus as claimed in claim 13, wherein each demultiplexing circuit comprise:
  means for outputting a detection signal when detecting the frame synchronizing pattern in one channel contained within the multiplexed signal, data being included in the multiplexed signal for each channel; and
  protection means for shifting a frame synchronizing pattern detection timing of the detection means which sends the detection signal to the timing generation means when the said detection means does not detect the frame synchronizing pattern within a predetermined number of successively multiplexed signals.

16. The digital signal demultiplexing apparatus as claimed in claim 15, wherein each demultiplexing circuit comprises:
  determining means for determining whether the demultiplexing circuit identification pattern which corresponds to the frame synchronizing pattern detected by the frame synchronizing pattern detection means matches the demultiplexing circuit identification pattern related to said demultiplexing circuit in which said determining means is included; and
  reset means for resetting the protection means when the determining means determines that the detected demultiplexing circuit identification pattern does not match the demultiplexing circuit identification pattern related to said demultiplexing circuit in which said reset means is included.

17. The digital signal demultiplexing apparatus as claimed in claim 11, wherein the multiplexed signal is scrambled, and the demultiplexing circuits respectively comprise means for descrambling the demultiplexed signal.

18. The digital signal demultiplexing apparatus as claimed in claim 11, which further comprises serial-parallel conversion means for converting the serial multiplexed signal into a plurality of parallel signals.

19. A digital signal multiplexing and demultiplexing apparatus having a digital signal multiplexing apparatus and a digital signal demultiplexing apparatus, said digital signal multiplexing apparatus comprising:
  n, where n is an arbitrary integer, multiplexing means, each for converting input signals from a plurality of lines into m, where m is an arbitrary integer, parallel signals to which additional bits are added and have a first transmission speed;
  parallel-serial conversion means for converting the m parallel signals from said n multiplexing means into a serial multiplexed signal by a parallel-serial conversion which uses a clock signal having a bit rate equal to m times a second transmission speed which is equal to n times the first transmission speed; and
  a bus for connecting the n multiplexing means and the parallel-serial conversion means,
  the n multiplexing means respectively having means for successively transmitting the m parallel signals to the bus in synchronism with a pulse signal having said second transmission speed, said digital signal demultiplexing apparatus including
  serial-parallel conversion means for converting said serial multiplexed signal into m parallel signals by a serial-parallel conversion which uses a clock signal having a speed equal to m times said second transmission speed;
  n demultiplexing means for demultiplexing added bits from the m parallel signals from said serial-parallel conversion means and for outputting the added bits on a plurality of lines with the second transmission speed; and
  a bus for connecting the serial-parallel conversion means and the n demultiplexing means,
  the n demultiplexing means respectively having means for receiving the m parallel signals output on the bus from the serial-parallel conversion means with a clock timing of a speed identical to the second transmission speed.

* * * * *